United States Patent
Schmeitz et al.

(10) Patent No.: US 9,013,477 B2
(45) Date of Patent: Apr. 21, 2015

(54) METHOD AND SYSTEM FOR PRODUCING A VIRTUAL OUTPUT IMAGE FROM DATA OBTAINED BY AN ARRAY OF IMAGE CAPTURING DEVICES

(75) Inventors: Harold Agnes Wilhelmus Schmeitz, Eindhoven (NL); Frederik Jan De Bruijn, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 161 days.

(21) Appl. No.: 13/704,285

(22) PCT Filed: Jun. 20, 2011

(86) PCT No.: PCT/IB2011/052677
§ 371 (c)(1),
(2), (4) Date: Dec. 14, 2012

(87) PCT Pub. No.: WO2012/001568
PCT Pub. Date: Jan. 5, 2012

(65) Prior Publication Data
US 2013/0088489 A1   Apr. 11, 2013

(30) Foreign Application Priority Data
Jun. 29, 2010 (EP) .................. 10167628

(51) Int. Cl.
*G06T 15/00* (2011.01)
*H04N 5/225* (2006.01)
*H04N 5/232* (2006.01)
*H04N 5/262* (2006.01)
*G06T 5/00* (2006.01)
*G06T 5/20* (2006.01)
*H04N 13/02* (2006.01)

(52) U.S. Cl.
CPC .............. *G06T 15/00* (2013.01); *H04N 5/2254* (2013.01); *H04N 5/23212* (2013.01); *H04N 5/2628* (2013.01); *H04N 13/0242* (2013.01); *G06T 5/003* (2013.01); *G06T 5/20* (2013.01); *G06T 2207/10052* (2013.01)

(58) Field of Classification Search
CPC . H04N 5/2254; H04N 5/2312; H04N 5/2628; H04N 13/0242; G06T 2207/10052; G06T 15/00; G06T 5/003; G06T 5/20
USPC .......................... 345/419, 428, 581, 589, 606
See application file for complete search history.

(56) References Cited

U.S. PATENT DOCUMENTS 8,754,829 B2 *  6/2014  Lapstun ........................... 345/6
2005/0121596 A1  6/2005  Kam et al.

FOREIGN PATENT DOCUMENTS

WO   2004075107 A2   9/2004

OTHER PUBLICATIONS

Hausler: "A Method to Increase the Depth of Focus by Two Step Image Processing"; Optics Communications, vol. 6, No. 1, Sep. 1972, pp. 38-42.

(Continued)

*Primary Examiner* — Phu K Nguyen

(57) ABSTRACT

A system for output of virtual output images includes an array of image capturing devices for providing image data. This image data is processed by convolving the image data with a function, e.g., the path, and thereafter deconvolving them, either after or before summation, with an inverse point spread function or a filter equivalent thereto to produce all-focus image data.

20 Claims, 28 Drawing Sheets

(56) References Cited

OTHER PUBLICATIONS

Kubota et al: "Reconstructing Dense Light Field From Array of Multifocus Images for Novel View Synthesis"; IEEE Transactions on Image Processing, Vol. 16, No. 1, Jan. 2007, pp. 269-279.

Kubota et al: "A Novel Image-Based Rendering Method by Linear Filtering of Multiple Focused Images Acquired by a Camera Array"; Proceedings 2003, International Conference on Image Processing, Barcelona, Spain, Sep. 2003, IEEE, Vol. 3, pp. 701-704.

Kubota et al: "Virtual View Synthesis Through Linear Processing Without Geometry"; 2004 International Conference on Image Processing (ICIP), 2004, IEEE, Vol. 5, Oct. 2004.

Kubota et al: "View Interpolation by Inverse Filtering: Generating the Center View Using Mutliview Images of Circular Camera Array"; Visual Communications and Image Processing 2007, SPIE, Vol. 6508, pp. 65082K-1-65082K-8.

Ou et al: "Efficient Free Viewpoint Image Acquisition From Multiple Differently Focused Images"; Visual Communication and Image Processing 2008, Proc. Of SPIE-IS&T Electronic Imaging, SPIE Vol. 6822, pp. 682221-1-682221-8.

Viola et al: "Rapid Object Detection Using a Boosted Cascade of Simple Features"; IEEE, 2001, pp. 1-511-1-518.

\* cited by examiner

METHOD AND SYSTEM FOR PRODUCING A VIRTUAL OUTPUT IMAGE FROM DATA OBTAINED BY AN ARRAY OF IMAGE CAPTURING DEVICES

FIELD OF THE INVENTION

The invention relates to a method for producing output image data for a virtual output image from input image data of individual input images provided by an array of image capturing devices for capturing a number of individual images from different viewpoints, the method comprising adding and inverse filtering of corresponding pixel values of the individual input images based on multiple depth layers in a scene.

The invention also relates to a system for constructing a virtual output image from input images obtained by an array of image capturing devices, the system comprising an array of image capturing devices for capturing images from different view points, wherein the system comprises a means for capturing image data from the image capturing devices of the array, the system comprising means for adding and inverse filtering of corresponding pixel values of the individual input images based on multiple depth layers in a scene.

BACKGROUND OF THE INVENTION

An image capturing device is capable of capturing an image. A typical image capturing device is a camera, comprising a lens and an image sensor behind the lens. An image of an object in front of the lens is projected by the lens on the image sensor. The so produced image has a limited depth of field, and provides information on the objects in the image from one viewpoint only. The spatial resolution that can be provided in the image is restricted by the aperture of the lens.

It is known that at least some of these problems can be reduced by providing a system comprising an array of image capturing devices.

An example of such a system is a so-called plenoptic camera. A plenoptic camera, also called a light-field camera, is a camera that uses a micro lens array (also known as a lenticular lens array) to capture light field information about a scene. A microlens array is situated between the lens and the image sensor. The micro lens array refocuses light captured by the lens onto the image sensor thereby creating many small images taken from slightly different viewpoints, which images are manipulated by software to extract depth information. Each of the small images has a relatively low spatial resolution. Each part of the sensor behind the micro lens array that captures the small image through one of the microlenses of the microlens array forms in itself an image capturing device. Thus, a plenoptic camera is or acts as a system comprising an array of image capturing devices.

It is possible, on basis of the data captured by a plenoptic camera to digitally refocus on a particular plane. This is for instance explained in Stanford Tech Report CTSR 2005-02, page 1-11, "Light Field Photography with a Hand-held Plenoptic Camera", by N G et al. However, although refocusing on a single plane is possible, the so-resulting image has a very limited depth of field. It is difficult to produce extended depth of field images. On page 6, right hand column, final paragraph of the Stanford Tech Report CTSR 2005-02 Ng et al have experimented by refocusing a light field at multiple depths and then applying a digital photomontage technique to produce a virtual output image. In the digital photomontage technique two techniques are applied: graph-cut optimization, to choose good seams within the constituent images so that they can be combined as seamlessly as possible; and gradient-domain fusion, a process based on Poisson equations, to further reduce any remaining visible artefacts in the composite. Basically the photomontage technique is a cut-and past technique, in-focus pixels of various images at various depths are combined to produce a virtual output image. Often the quality of the resulting virtual output image is dependent on using an estimated depth map so as to know which pixels are in-focus. Ng et al also produced extended depth of field by extracting a single sub-aperture image, but this technique results in quite noisy images.

The resulting images are, however, quite noisy and/or require an active role of the user.

A method and system of the opening paragraphs is discloses in "View Interpolation by Inverse Filtering: Generating the Center View using Multiview images of Circular Camera Array" by Akira Kubota, Kazuya Kodama and Yohisnori Hatori in Visual Communications and Image Processing, Proc. of SPIE-IS&T Electronic Imaging, SPIE Vol. 6508.

In this article a method is described in which a virtual output image is reconstructed at the center of a camera array arranged on a circle. Summing up all corresponding pixel values of input images obtained from the cameras in the array with respect to multiple depth layers a candidate image is created and the virtual output image is reconstructed by inverse filtering of the candidate image. The advantage of this method is that no depth information has to be known in advance.

The known system, however, has only limited possibilities and does not provide for real-life simulating imaging in particular in interactive systems.

SUMMARY OF THE INVENTION

It is an object of the invention to provide a method and system with increased possibilities.

To that end the method according to the invention is characterized in that a virtual camera position is provided by an input virtual camera position signal representing the virtual camera position and the adding and inverse filtering is performed in dependence of the virtual camera position to produce the image data for the virtual output image as seen from the virtual camera position.

In the known system and method the virtual camera position is fixed at the centre of the circular camera array and the image produced is the image from said centre of the circular array. The inventors have realized that using a signal for a virtual camera position and adding and inverse filtering in dependence of the signal for the virtual camera position allows more real-life imitating imaging, in particular in interactive systems. This allows for instance true eye-to-eye contact simulation, which is impossible with the existing method and system.

In an embodiment the adding and inverse filtering comprises the method steps of:

constructing from the input image data of the individual images image data for a number of synthetically focused images at a number of depths, adding the image data of the number of synthetically focussed images at various depths to form the image data for an integrated blurred image, and thereafter deconvolving the integrated blurred image using an inverse point spread function for producing the image data for the virtual output image, from the input image data of the individual images.

A point spread function is a function that expresses the expected blur due to a pixel in an image by integrating the stack of re-focussed images.

At first sight it seems counterproductive to produce a blurred integrated image. The integrated image is formed by adding, since integrating means an addition, a number of re-focussed images, each refocused image being a refocused image at a specific depth of field. Another expression used below for such an integrated image is the integration of a focal stack. A stack is a number of images; a focal stack is a stack of images wherein each image is at a specific depth of field. Integration means adding together the focal stack of images. Any re-focussed image at a specific depth of field will have some parts of the image in focus, namely those parts that are situated at the specific depth of field. Other parts of the objects in the image will be not in focus and thus blurred. If one adds a number of such re-focused images together the resulting integrated image will be severely blurred. Thus, it may seem that this step is counter-productive since it results in a highly blurred integrated image.

However, apart from the integration, the method also provides for use of a point spread function, i.e. a function that provides the blurred image of a point and using this point spread function, or more precisely the inverse point spread function to deconvolve the integrated stack of re-focussed images.

Knowing the point spread function it is possible to deconvolve the integrated images and get each pixel in focus over the depth of field range. The result is an image of extended depth of field. The input of the virtual camera position allows the point of view of the image to be flexible allowing views from various vantage points.

It is not needed to have a depth model for the image; complicated algorithms for cut-and-past method are not needed. The point spread function is substantially the same for all images taken. These advantages provide for images of higher quality.

In an embodiment the method comprises:
a for a number of depths shifting the individual input images provided by the image capturing devices in proportion to the distance between the position of the particular image capturing devices and the virtual camera position and in dependence on the specific depth, to align the individual input images to the virtual camera position and then
b. adding the image data for the shifted images at each depth together to form image data of a synthetically focused images at the number of depths,
c. adding the number of synthetically focussed images to form the integrated blurred image
d. generating a point spread function by integrating expected blur kernels for a pixel
e. deconvolving the integrated blurred image, using the inverse point spread function of the point spread function, for producing the image data for the virtual output image at the virtual camera position provided by the input virtual camera position signal.

The resulting virtual output image is an image with a large Depth of Field (DoF) from the viewpoint.

It is remarked that where, in this application, mention is made of "a virtual output image" reference is made to the image data for the virtual output image. The virtual output image itself is usually made by sending the image data for the virtual output image to a device for making an image, for instance a display device or printing device, in which device the image data is used to address image pixel generating parts (such as LCD cells or print heads), to produce an image on e.g. a display screen or on a print screen. It is not excluded that the image data for the virtual output image is post-processed before displaying it or printing it, for instance to correct for errors, to replace part of the image with a background or to make the data better suitable for the device to which the data will be presented.

This first embodiment provides for a basic solution.

However, the required processing power is relatively large, which may pose a problem especially in real-time applications.

In a second embodiment the method comprises the following method steps:
a. generating a projected path of the image shift with respect to the virtual camera position for each image capturing device of the array, the projected path being the sum of translating impulse response functions, for aligning the image of a image capturing device with the virtual camera position at a number of depths
b. convolving the individual images with their respective projected path to form convolved images
c. adding the convolved images to form an integrated blurred image
d. generating a point spread function by integration of the projected paths
e. deconvolving the integrated image, using the inverse point spread function of the point spread function, for producing the image data for the virtual output image at the vertical camera position provided by the input virtual camera position signal.

The integrated blurred image provided in step c of this second embodiment corresponds to the integrated image of step c in the first embodiment, i.e. it corresponds to an image produced by adding a number of synthetically focussed images at various depths (even though the full focal stack itself has not been made).

Instead of, as is done in the first embodiment, generating a full focal stack and then integrating, in the second embodiment the individual images from the image capturing devices of the array are convolved with their respective projected paths. The resulting generated image of step c is an image corresponding to an image generated by making a full focal stack and then integrate the full focal stack. However, the method according to the second embodiment strongly reduces, compared to the first embodiment, the number of required computations. The second embodiment provides for an alternative, less computer power demanding, route to providing an image corresponding to producing an image by integrating a stack of re-focussed images at various depths. The next step, deconvolution using the inverse point spread function, is part of both first and second embodiments. Because the second embodiment requires less computing power it is of particular relevance for systems or apparatuses or circumstances in which this is of importance. Real time applications form one of them, since the times between images is limited. Real eye-to-eye contact simulating systems is another since real eye-to-eye contact is only possible in real-time and if the movement of the eyes can be followed fast enough, i.e. if the virtual camera position can be changed fast. Also, the second embodiment is very advantageous in circumstances where one would want to have the choice of how many camera are involved in the method and/or in circumstances where a camera within the array would malfunction. The fact that the individual images are convolved allows a faster method.

It is remarked that this reduction in computation in the second embodiment as compared to the first embodiment is possible because the shift of a pixel position is a linear function of depth and of the distance between the particular image capturing devices and the point of view of the virtual camera position. This insight combined with the insight that the order of the various mathematical function can be interchanged allowed the inventors to arrive at this faster method.

According to another embodiment of the method of the invention is characterized by:

a. generating a projected path of the image shift for each image capturing devices of the array with respect to the virtual camera position, the projected path being the sum of translating impulse response functions for aligning the image with the virtual camera position at a number of depths
b. generating a point spread function by integration of the projected paths
c. for each image convolving the respective projected path with the inverse point spread function
d. convolving each image with the convolution of path and inverse point spread function providing a convolved image
e. adding the convolved images for producing the image data for the virtual output image at the vertical camera position provided by the input virtual camera position signal.

This is a variation of the second embodiment wherein the insight that the various mathematical operations can be interchanged is brought one step further.

In a further embodiment the adding and inverse filtering comprises the method steps of:

a. generating a projected path of the image shift for each image capturing device of the array, the path being determined with respect to the virtual camera position, the projected path being the sum of translating impulse response functions for aligning the image of a image capturing device with the virtual camera position at a number of depths
b. convolving the individual camera images with their respective projected path
c. convolving the image of each image capturing device with a highpass filter perpendicular to the projected path,
d. adding the convolved images for producing the image data for the virtual output image at the virtual camera position provided by the input virtual camera position signal.

The highpass filter compensates for the blur, i.e. it has the function corresponding to the application of the inverse point-spread function in the first and second embodiments of the first aspect.

In a variation on the further embodiment adding and inverse filtering comprises the method steps of:

a. generating a projected path of the image shift for each image capturing device of the array, the path being determined with respect to the virtual camera position, the projected path being the sum of translating impulse response functions for aligning the image of a image capturing device with the virtual camera position at a number of depths
b. generating a convolution filter for each image by convolving its respective projected path with a highpass filter perpendicular to it
c. convolving the individual input images with their respective filter as generated in b
d. adding the convolved images for producing the image data for the virtual output image at the virtual camera position provided by the input virtual camera position signal.

In the method according to the latter two embodiments the required computation power is reduced even further, be at a cost of some accuracy. The method can be seen as a derivation of the methods of the first mentioned embodiments.

Although a filter with fixed parameters can be used, preferably the high pass filter has parameters that are a function of the projected path, in particular of the length of the projected path.

The method of the invention can be performed by a plenoptic camera.

Extended focus depth is for instance very useful for microscopy and digital pathology.

A single acquisition can encompass a large or even an entire sample depth range, reducing the need for exact focusing in for instance microscopy. Data rate and sampling time are reduced.

The method of the invention can also be performed by an array of individual cameras, situated around for instance a computer screen. This enables amongst others a virtual camera position within the screen surface. The decreased demand for computing power simplifies the creation of a virtual viewpoint within the surface of the screen, so that it becomes possible to perform it in real time.

In particular when use is made of two interacting systems each comprising an array of image capturing devices around a display screen the method of the invention opens up possibilities known methods do not provide. By having one of the interacting systems provide the signal for the virtual camera position for the other system and vice versa, realistic eye-to-eye contact simulation is possible. Making at least one of the signals for the virtual camera position coincide with the positions of the eyes of a person sitting in front of the system allows such realistic eye-to-eye contact simulation.

The invention is also embodied in computer programs comprising program code means for performing a method of the invention and in computer program product comprising program code means stored on a computer readable medium for performing a method of the invention when said program is run on a computer.

The invention is also embodied in a system for constructing an output image from input images obtained by an array of image capturing devices, the system comprising an array of image capturing devices for capturing images from different view points, wherein the system comprises a means for capturing image data from the image capturing devices of the array, the system comprising means for adding and inverse filtering of corresponding pixel values of the individual input images based on multiple depth layers in a scene, characterized in that the system comprises a means to provide a virtual camera position by an input virtual camera position signal representing the virtual camera position and the means for adding and inverse filtering are arranged to operate as a function of the selected virtual camera position to produce the image data for the virtual output image at the virtual camera position provided by the input virtual camera position signal.

In an embodiment the means for adding and inverse filtering comprises:

means for constructing from the input image data of the individual images image data for a number of synthetically focused images at a number of depths
means for adding the image data of the number of synthetically focussed images at various depths to form the image data for an integrated blurred image, and
means for deconvolving the integrated blurred image using an inverse point spread function for producing the image data for the virtual image, from the input image data of the individual images.

In embodiments the system comprises:

means for shifting for a number of depths the individual input images provided by the image capturing devices in proportion to the distance between the position of the particular image capturing devices and the virtual camera position and in dependence on the specific depth, to align the individual input images to the virtual camera position and means for adding the image data for the shifted images at each depth together to form image data of a synthetically focused images at the number of depths, means for adding the number of synthetically focussed images to form the integrated blurred image means for generating a point spread function by integrating expected blur kernels for a pixel means for deconvolving the integrated blurred image, using the inverse point spread function of the point spread function, for producing the image data for the virtual output image at the virtual camera position provided by the input virtual camera position signal.

In an embodiment the means for adding and inverse filtering comprises:

means for generating a projected path of the image shift with respect to the virtual camera position for each image capturing device of the array, the projected path S being the sum of translating impulse response functions, for aligning the image of a image capturing device with the virtual camera position at a number of depths means for convolving the individual images with their respective projected path to form convolved images means for adding the convolved images to form an integrated blurred image means for generating a point spread function by integration of the projected paths means for deconvolving the integrated image, using the inverse point spread function of the point spread function, for producing the image data for the virtual output image at the vertical camera position provided by the input virtual camera position signal.

In a further embodiment the means for adding and inverse filtering comprises:

means for generating a projected path of the image shift for each image capturing devices of the array with respect to the virtual camera position, the projected path being the sum of translating impulse response functions for aligning the image with the virtual camera position at a number of depths means for generating a point spread function by integration of the projected paths means for convolving for each image the respective projected path with the inverse point spread function means for convolving each image with the convolution of path and inverse point spread function providing a convolved image means for adding the convolved images for producing the image data for the virtual output image at the virtual camera position provided by the input virtual camera position signal.

In an embodiment the means for adding and inverse filtering comprises:

means for generating a projected path of the image shift for each image capturing device of the array, the path being determined with respect to the virtual camera position, the projected path being the sum of translating impulse response functions for aligning the image of a image capturing device with the virtual camera position at a number of depths means for convolving the individual camera images with their respective projected path means for convolving the image of each image capturing device with a highpass filter perpendicular to the projected path, means for adding the convolved images for producing the image data for the virtual output image at the virtual camera position provided by the input virtual camera position signal.

In embodiments the means for adding and inverse filtering comprises:

means for generating a projected path of the image shift for each image capturing device of the array, the path being determined with respect to the virtual camera position, the projected path being the sum of translating impulse response functions for aligning the image of a image capturing device with the virtual camera position at a number of depths means for generating a convolution filter for each image by convolving its respective projected path with a highpass filter perpendicular to it means for convolving the individual input images with their respective filter means for adding the convolved images for producing the image data for the virtual output image at the virtual camera position provided by the input virtual camera position signal.

Preferably the array of image capturing devices is an array of cameras at the periphery of a display screen and the virtual camera position is a point at the display screen.

Even more preferably the system comprises two interacting sub-systems, each subsystem comprising an array of cameras at the periphery of a display screen, and the virtual camera position at the display screen of one of the systems is determined by the other of the systems by measuring the position of eyes of a viewer of the other of the systems. Realistic eye/to eye contact simulation is then possible.

In embodiments the system comprise a plenoptic camera, the plenoptic camera comprising the array of image capturing devices The array is in embodiments subdivided into two or more subarrays.

BRIEF DESCRIPTION OF THE DRAWINGS

These and further aspects of the invention will be explained in greater detail by way of example and with reference to the accompanying drawings, in which.

The figures are not drawn to scale. Generally, identical components are denoted by the same reference numerals in the figures.

DETAILED DESCRIPTION OF PREFERRED EMBODIMENTS

Explanation of the Concept of a Light Field

Figure 1:
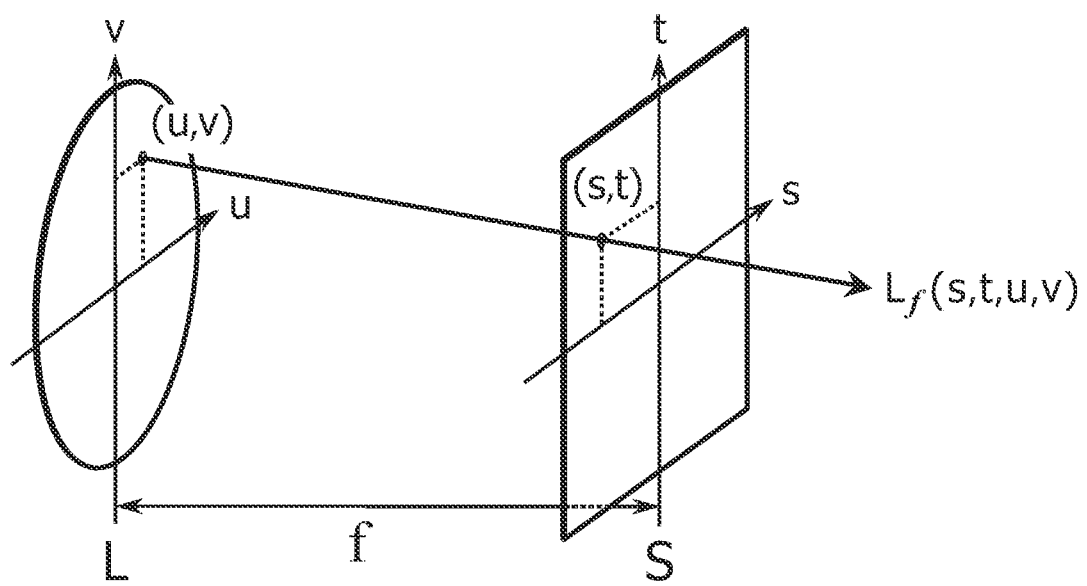
FIG. 1 illustrates some definition of symbols in a light field

The complete collection of light rays between a lens plane and sensor plane is often referred to as a light field; a term that was introduced by Marc Levoy of Stanford University. A light field is the complete (intensity wise) description of all the light rays departing from the lens aperture and arriving at the sensor plane. The simplest way to define it is as a function $L_f(s,t,u,v)$, where u and v are the coordinates in the lens plane, and s and t the coordinates in the image plane. Full knowledge of the light field allows full reconstruction of an image at various depths. FIG. 1 illustrates the definition of certain symbols. L stands for the Lens plane and S for the sensor plane.

The pixel value at coordinate (s,t) is directly proportional to the irradiance I(s,t) at that spot, which is the accumulation/integral of light coming from all possible angles, or in formula form, $$I_f(s,t) = \frac{1}{f^2} \int\int L_f(s,t,u,v) du dv \qquad (1)$$

wherein the integral is taken over the lens plane (u,v).

The pixel value itself does not provide direct and full information of the total light field.

Figure 2A:
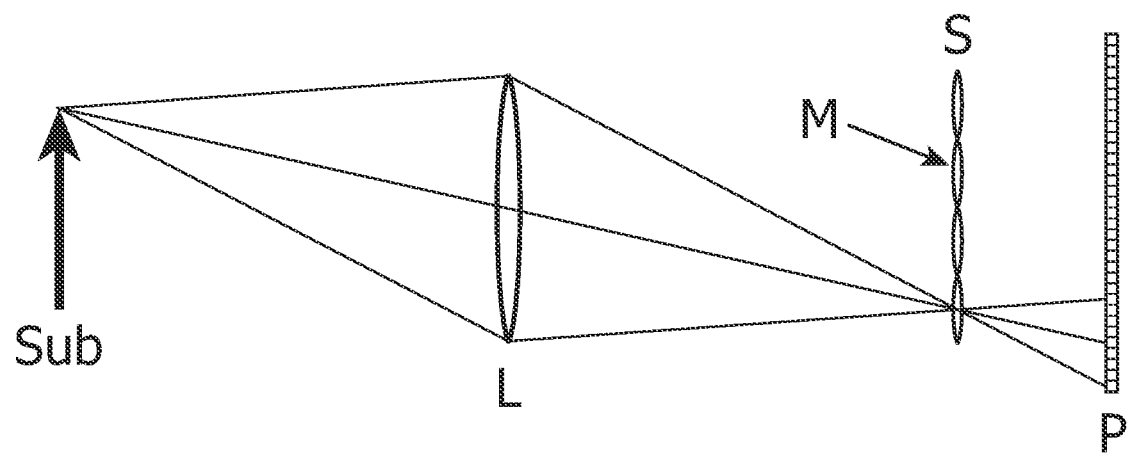
FIGS. 2A and 2B illustrate light paths through a main lens and a microlens array
Figure 2B:
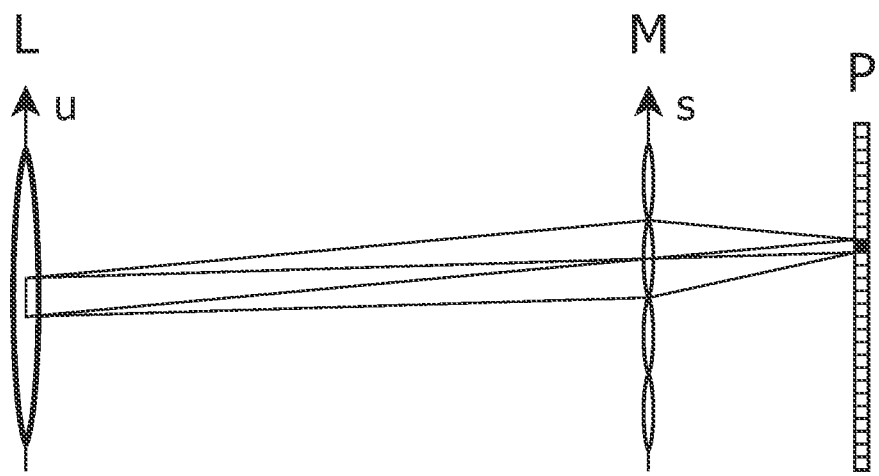
Figure 2B:
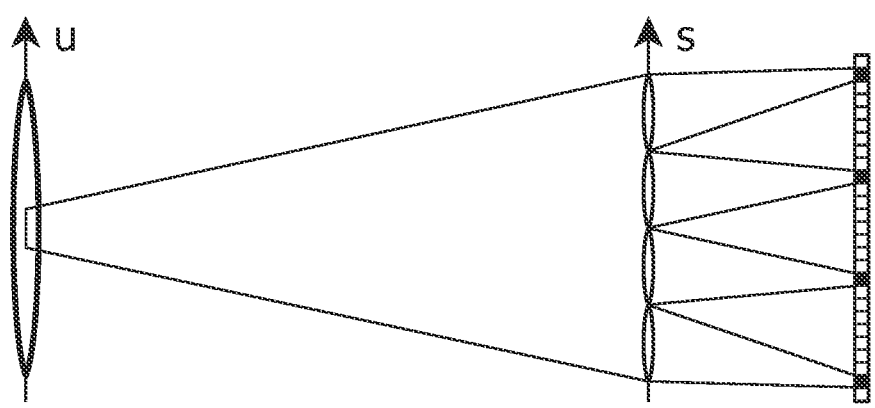

By placing a microlens array M in the plane S that was originally the sensor plane (see FIGS. 2A and 2B), and a sensor P at a focal distance of the microlens array behind the microlens array, one can construct a so-called plenoptic camera that can directly measure $L_f(s,t,u,v)$. In this design, each microlens can be seen as a 'meta' pixel capable of capturing the intensity and incident angle of the arriving light rays. The microlens array M refocuses light on the image sensor P at low spatial resolution. As such, the directional information is stored at the expense of spatial resolution. To each microlens of the microlens array M a small part of the image sensor P is attributed, the image sensor P thereby forming an array of image capturing devices, each image capturing device capturing an image of low spatial resolution made by one of the microlenses. Sub stands for the subject.

Knowing the intensity as a function of angle and position at the detector plane, one can synthesize images at different aperture/focus settings. By limiting the angle of the contributing light rays (only integrate over a part of the (u,v) plane), one can synthesize the image belonging to any aperture, e.g. such that only the light from the top half of the lens is contributing. Similarly, by first applying a transformation to the light field $L_f(s,t,u,v)$ and then an integration step over the (u,v) plane, one can calculate the image at a different focus plane, in other words one can synthesize an image at different focal planes and get full 3-D information.

Figure 3:
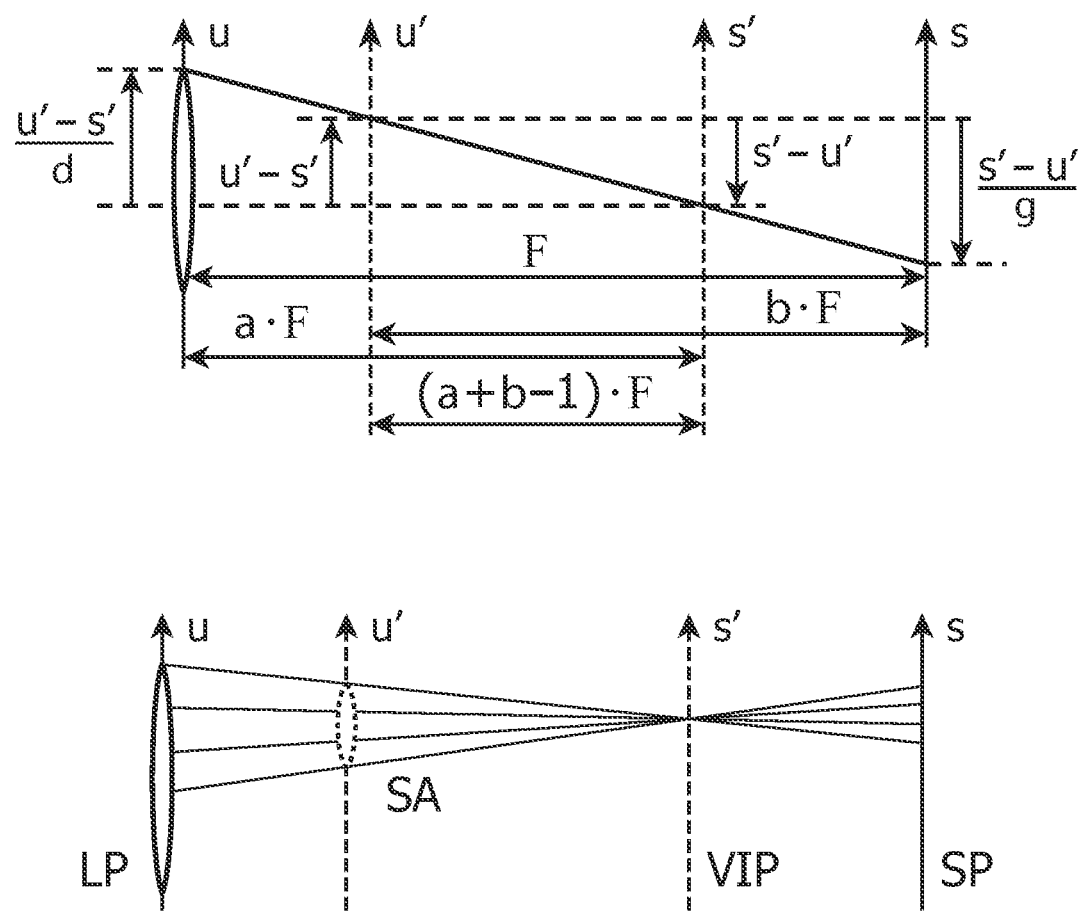
FIG. 3 illustrates refocusing the lightfield data to a synthetic image plane FIG. 4 schematically depicts a top view of a camera array observing a point P

FIG. 3 shows this in more detail.

Given the captured light field $L_f(s,t,u,v)$ described in the coordinates of the sensor plane SP (s,t) and of the lens plane LP (u,v) we can calculate any image that is focused within a new synthetic focal plane SFP (s',t') at distance αF from the lens plane LP and taken through a synthetic aperture plane SA with coordinates (u',v') at distance βF from the sensor plane SP. This situation is depicted in FIG. 3. By defining $$\gamma = \frac{\alpha+\beta-1}{\alpha} \text{ and } \delta = \frac{\alpha+\beta-1}{\beta} \qquad (2)$$

the synthesized image follows from the general expression $$I_f(s',t') = \frac{1}{f^2}\int\int L_f\left(s'+\frac{u'-s'}{\delta}, t'+\frac{v'-t'}{\delta}, u'+\frac{s'-u'}{\gamma}, v'+\frac{t'-v'}{\gamma}\right) du' dv' \qquad (3)$$

where a value of α≠1 indicates a synthetic focal plane SFP other than the sensor plane SP, and where β≠1 indicates a synthetic aperture plane different than the original lens plane. Note that a limitation of the range of (u',v') in the integration allows synthesizing any shape of aperture other than a circle. Correspondence of a Plenoptic Camera and an Array of Camera's:

There is a correspondence between an array of microlenses with a single camera, i.e. a plenoptic camera, and an extended array of cameras with a single lens. Both are systems with an array of image capturing devices; in a plenoptic camera the array of image capturing devices is formed in the image sensor by the array of small parts of the image sensor capturing the light through each of the microlenses; in an extended array of camera with a single lens the camera's themselves form the array of image capturing devices. Therefore, the synthetic aperture techniques and generating refocused images at various depths as described in this application for a micro lens array in a plenoptic camera can also be applied to an extended camera arrays and vice versa. The major difference between a plenoptic camera and an array of cameras, however, is that an array of cameras can be distributed over a larger area than covered by a plenoptic camera. The system comprising an extended array of camera's then functions as single camera with an aperture as big as the entire camera array, which is usually much larger than the aperture of a plenoptic camera.

Having a large aperture has a large advantage in that a very sharp image can be provided due to the large effective aperture. However, it has the disadvantage that the depth of field is very small. Thus, even more than for a plenoptic camera, it is a difficult task to provide a sharp image with a sufficient depth of field.

Figure 4:
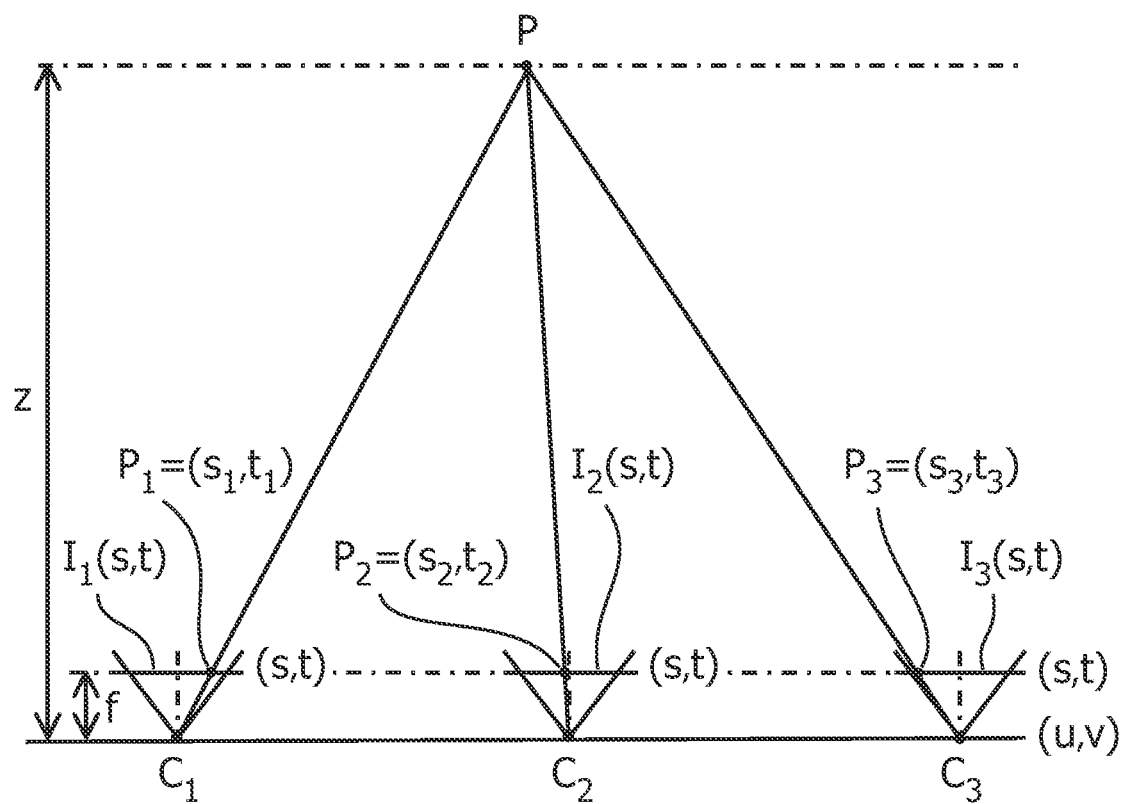

Array of Cameras:

FIG. 4 schematically depicts a top view of a camera array observing a point P. The cameras are treated as pinhole cameras; this simplification does not restrict the practical value of the analysis. The position of each camera is indicated by the camera centre $C_k$ with k an index number (k=1, 2, 3 . . . ); the camera centre is the location of the pinhole of the camera. This pinhole, or more general optical centre, functions as the centre of the perspective projection of the world on the camera's image plane. The image plane of each camera is located at a focal distance f from the camera centre; the placement of the image plane in front instead of behind of the pinhole is mathematically equivalent. Each camera image $I_k(s,t)$ has coordinate system (s,t). In principle, each camera can have an arbitrary position, focal distance and orientation. For simplicity however, we continue assuming the cameras to be located in on single plane with coordinate system (u,v). The coordinates of camera centre $C_k$ are defined as $C_k=(u_k,v_k)$. Initially we assume the cameras to be located on a horizontal line. The focal lengths are assumed to be identical and the cameras face forward such that their image planes coincide. These simplifications are not restricting the general validity of the analysis.

Figure 5:
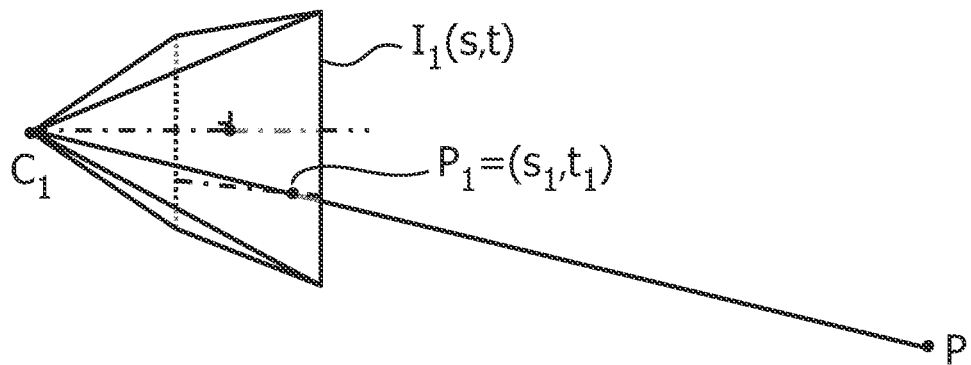
FIG. 5 shows a three-dimensional impression of camera $C_1$ with observed point P

FIG. 5 shows a three-dimensional impression of camera $C_1$ with observed point P, and $P_1$ its projection in the image plane $I_1(s,t)$ with a horizontal coordinate $s_1$ (and some arbitrary vertical coordinate $t_1$, for which we assume that $t_1=t_2=t_3$ as we initially consider the case in which the camera position only differs in the horizontal direction).

Figure 6:
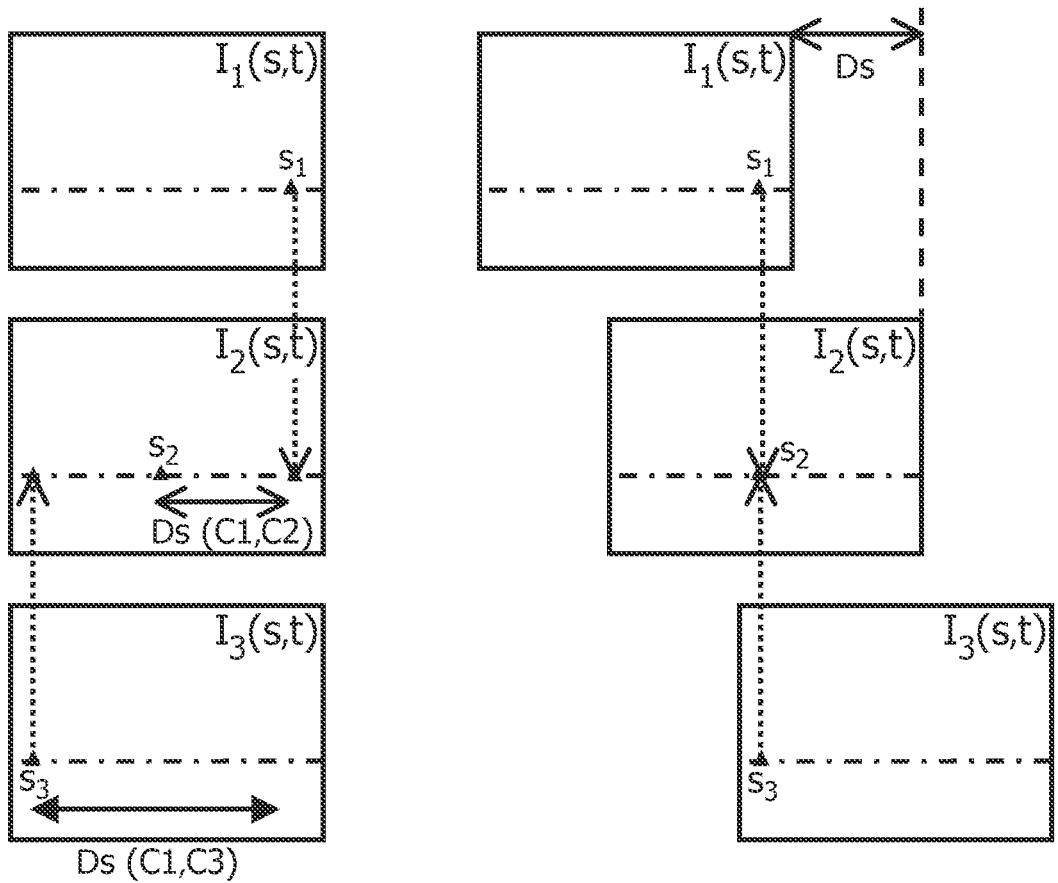
FIG. 6 illustrates the concept of synthetic refocusing on the basis of accumulation of shifted images FIG. 7 provides a graphical depiction of a filter kernel

Synthetic Refocusing:

FIG. 6 illustrates the concept of synthetic refocusing on the basis of accumulation of shifted images. On the left, the three different camera images $I_1(s,t)$ for camera 1, $I_2(s,t)$ for camera 2, $I_3(s,t)$ for camera 3, are depicted, with the projection of one and the same point P of an object at horizontal image coordinates $s_1$, $s_2$ and $s_3$ respectively. The distance between the projections $s_1$ and $s_2$ is given by $\Delta s$ (C1, C2) in FIG. 6. The distance between the projections $s_1$ and $s_3$ is given by $\Delta s$ (C1, C3). The points $s_1$, $s_2$ and $s_3$ can be made to align by shifting the image of camera $C_2$ over a distance $\Delta s$ (C1, C2) and the image of camera $C_3$ over a distance $\Delta s$ (C1, C3). The distances between the three projected points due to parallax is directly related to the distance of the observed point P. The relation between the image coordinate difference and the distance follows from $$\Delta s = -\Delta u \frac{f}{z}. \quad (4)$$

For instance, comparing cameras $C_1$ and $C_2$, we define $\Delta s=s_2-s_1$ and $\Delta u=u_2-u_1$, where $u_1$ and $u_2$ are the horizontal coordinates of camera centres $C_1$ and $C_2$ respectively, as depicted in FIG. 4.

The linear relation between the parallax shift and object distance is valid in both the horizontal and vertical direction, such that point P appears sharp only when all images in the stack, in this example the images of cameras 1, 2 and 3, are properly aligned, i.e. so shifted that the projections of point P coincide. Accumulation of pixel values in the aligned image stack results in an image that is synthetically refocused on point P. Moreover, due to the linear relationship between parallax shift and object distance, as suggested by expression (4), all points with the same distance as point P will appear sharp in the synthetically focused image.

In this example, the position of camera $C_1=(u_1,v_1)$ is implicitly regarded as a reference for all other cameras so $(\Delta u_k, \Delta v_k)=(u_k-u_1,v_k-v_1)$. As a consequence, for camera $C_1$, $(\Delta u_1,\Delta v_1)=(0,0)$. Also as a consequence, the same holds for its image-coordinate system, such that $(\Delta s_k,\Delta t_k)=(s_k-s_1,t_k-t_1)$. Again for camera $C_1$, $(\Delta s_1,\Delta t_1)=(0,0)$. Using the position of camera centre $C_1$ as a reference, the synthesized image focused at distance z, $I_{1,z}(s,t)$, now follows from the accumulation of all camera images after translating each image $I_k$ with vector $(\Delta s_k,\Delta t_k)^T$, $$I_{1,z}(s,t) = \sum_{k=1}^{N} I_k(s - \Delta s_k, t - \Delta t_k), \forall (s, t), \quad (5)$$

where N is the number of cameras, and where each translation vector follows from $$(\Delta s_k, \Delta t_k)^T = -\frac{f}{z}(\Delta u_k, \Delta v_k)^T. \quad (6)$$

The notation $(\ )^T$ identifies a matrix or vector transpose operation.

Anticipating the application to all-focus imaging, we already introduce a more formal notation of the camera-image shift by expressing the process of translation in terms of a convolution with a shifted delta-function, $$I_{1,z}(s,t) = \sum_{k=1}^{N} (I_k * T_{\Delta s_k,\Delta t_k})(s,t), \forall (s, t), \quad (7)$$

where the notation * denotes a convolution, $$(f * g)(s, t) = \sum_{m=-\infty}^{\infty} \sum_{n=-\infty}^{\infty} f(m, n) \cdot g(s - m, t - n), \forall (s, t), \quad (8)$$

and where the filter kernel $T_{\Delta s_k,\Delta t_k}$ is shifted delta function, causing the input data to appear at a translated position in the output image frame over a vector $(\Delta s_k,\Delta t_k)^T$ after convolution, $$T_{a,b}(s,t)=\delta(s-a,t-b). \quad (9)$$

The delta function is defined as an impulse response function, $$\delta(s, t) = \begin{cases} 1, & \text{for } s = 0 \text{ and } t = 0, \\ 0, & \text{elsewhere.} \end{cases} \quad (10)$$

Figure 7:
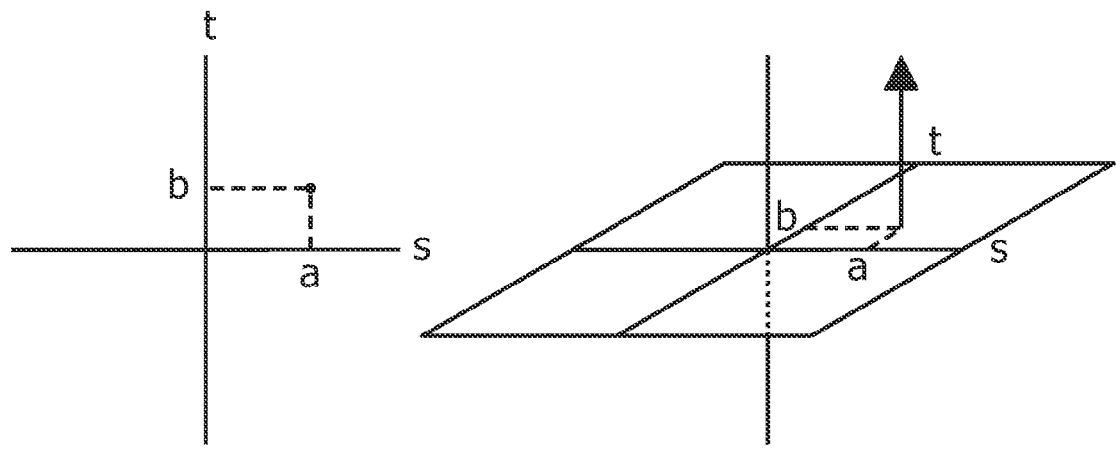

The graphical depiction of a filter kernel according to expression (9) is depicted in FIG. 7.

Although apparently cumbersome at first, we can combine expressions (5), (6) for the calculation of the refocused image $I_{1,z}(s,t)$ $$I_{1,z}(s, t, u_1, v_1) = \sum_{k=1}^{N} I_k\left(s - \frac{f}{z}(u_1, u_k), t + \frac{f}{z}(v_1 - v_k)\right), \quad (11)$$

$$\forall (s, t),$$

In the above expression the position of camera $C_1$ has been taken as the reference.

Instead of choosing camera $C_1$ as reference camera, expression 11 shows that the synthetically refocused image $I_z$ can be calculated using any arbitrary camera position as a reference position.

This reference camera position does not have to coincide with any of the real cameras in the array. We will refer to the reference-camera centre RCC as $C_0 = (u_0, v_0)$. The physical significance of the reference-camera centre RCC is that it describes the centre of a virtual camera located at a position $(u_0, v_0)$ which usually will be within the plane of the existing cameras. As such, $C_0$ functions as the optical centre of this virtual camera, defining the centre of a perspective projection on the virtual-camera's image plane. Despite the arbitrary choice of this virtual viewing position, the virtual camera retains a synthetic focus on a plane parallel to the plane of the camera centres located at a distance z.

Figure 8:
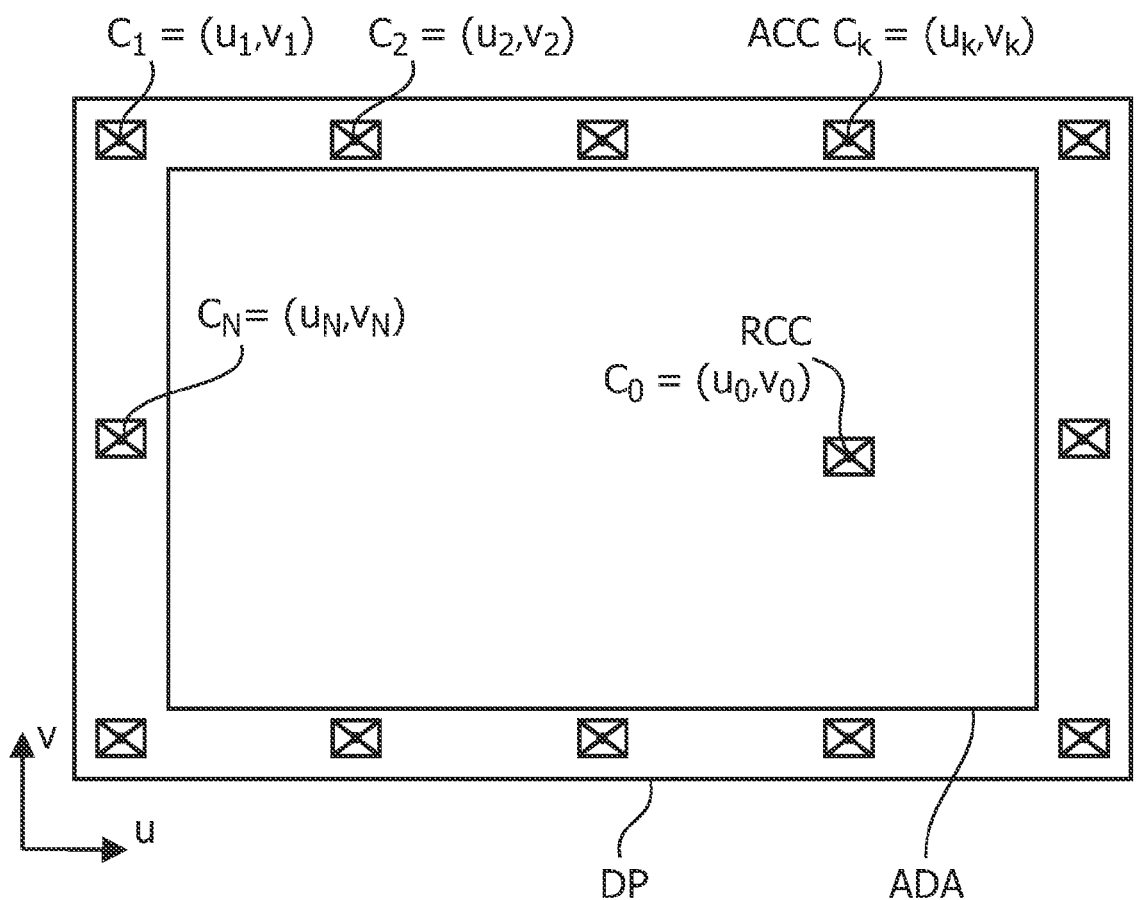
FIG. 8 shows a schematic frontal view of a peripheral camera array FIG. 9 gives a block diagram of a calculation of a synthetically focused output image

The method and system of invention is particular useful (but not limited to) when using a peripheral camera array. The cameras at the screen periphery provide the inputs for synthesizing a camera image from a new, non-existing camera, positioned at an arbitrary position within the perimeter of the display; this is depicted in FIG. 8. FIG. 8 shows a schematic frontal view of a peripheral camera array, which could be placed in the perimeter of a computer display. The coordinate indicated as (u,v) indicate the position of the each camera in the plane of the array. DP stands for the display frame and ADA for the active display area.

In summary, assuming our virtual reference camera centre RCC to be positioned at $C_0 = (u_0, v_0)$, in the active display area we can calculate the view from this camera when it is synthetically refocused at a distance z $$I_{0,z}(s, t) = I_z(s, t, u_0, v_0) = \sum_{k=1}^{N} I_k \begin{pmatrix} s - \frac{f}{z}(u_0 - u_k), \\ t - \frac{f}{z}(v_0 - v_k) \end{pmatrix}, \forall (s, t), \quad (12)$$

Figure 9:
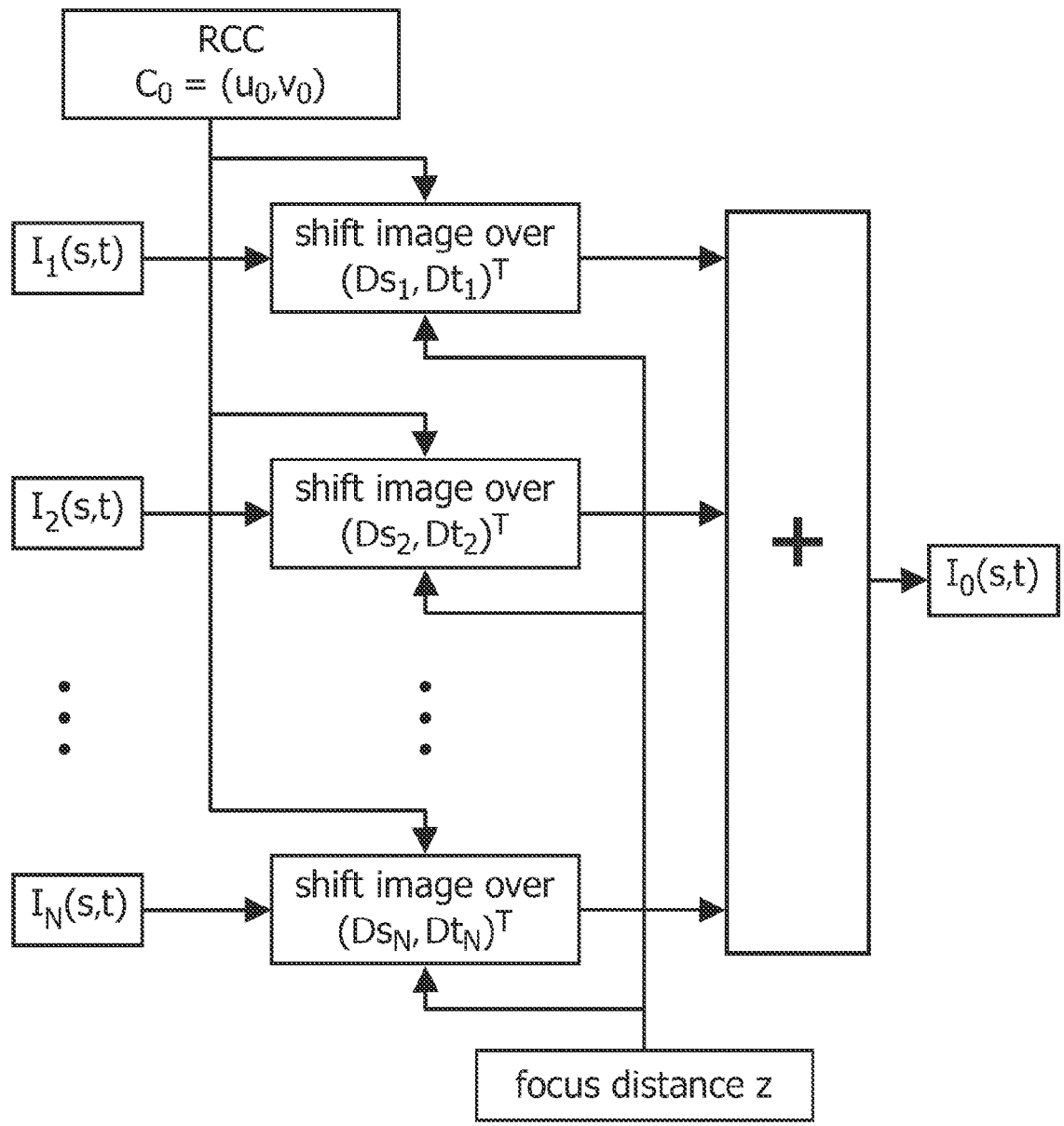

FIG. 9 gives a Block diagram of the calculation of a synthetically focused output image $I_0$ from a virtual camera position $(u_0, v_0)$, using a set of array-camera images $I_K$. The virtual camera position is an input for the block diagram and represented by signal $C_0$. Each image-shift vector $(\Delta s_k, \Delta t_k)$ is defined according to expression 6. FIG. 9 provides a Block diagram of the calculation of a synthetically focused output image $I_0$ from a virtual camera position $(u_0, v_0)$ using a set of array-camera images $I_K$. Each image-shift vector $(\Delta s_k, \Delta t_k)$ is defined according to expression (6). The virtual camera position is an input for the method.

Using the convolution based implementation of an image translation we can write expression (12) as $$I_{0,z}(s, t) = I_z(s, t, u_0, v_0) = \sum_{k=1}^{N} (I_k * T_{\Delta s_k, \Delta t_k})(s, t), \forall (s, t), \quad (13)$$

With $$(\Delta s_k, \Delta t_k)^T = -\frac{f}{z}(u_k - u_0, v_k - v_0)^T. \quad (14)$$

Figure 10:
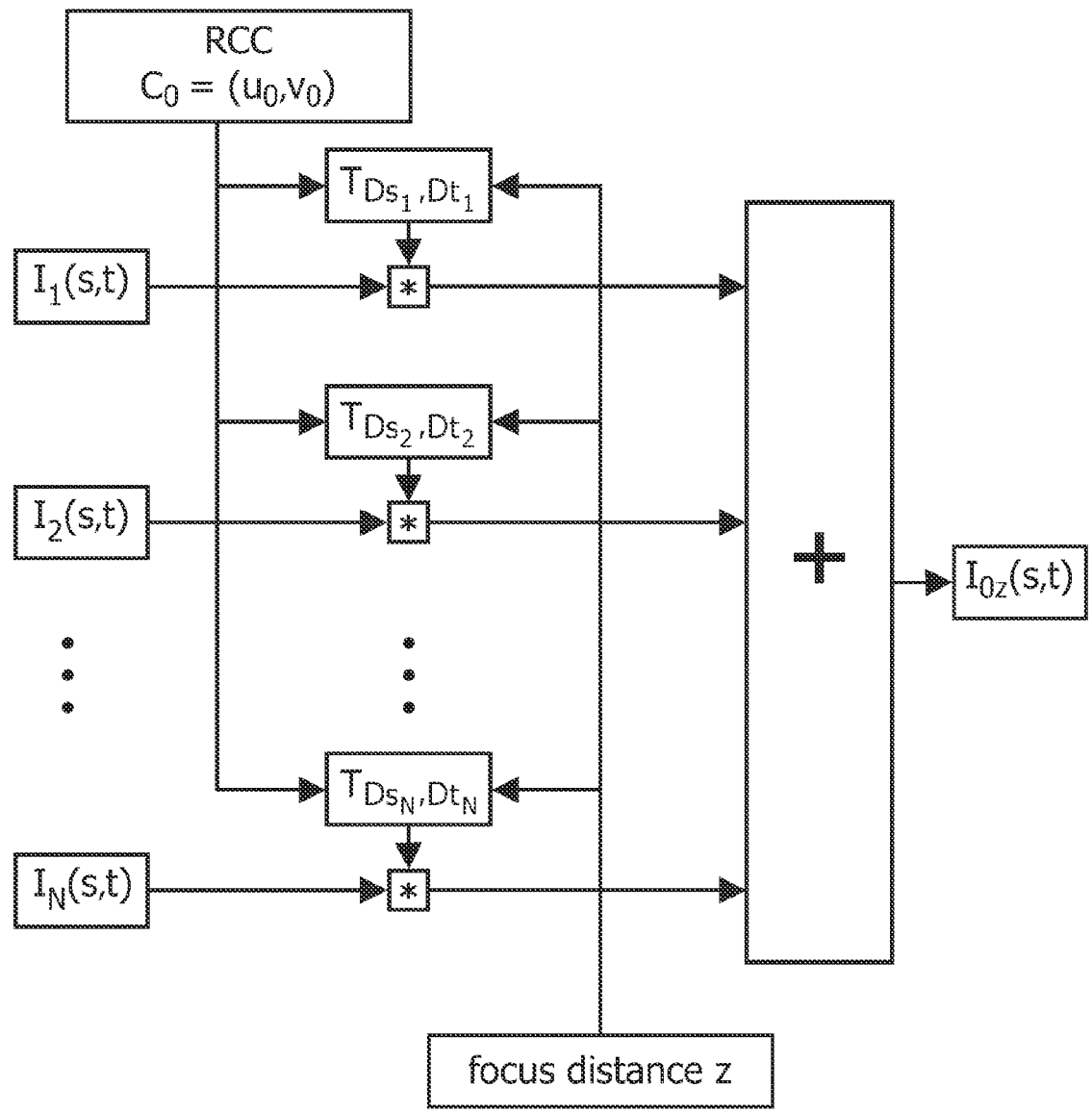
FIG. 10 shows a block diagram of a further calculation of a synthetically focused output image

Using the convolution-based implementation we construct a block diagram as depicted in FIG. 10.

FIG. 10 shows a Block diagram of the calculation of a synthetically focused output image $I_0$ from a virtual camera position $(u_0, v_0)$ using a set of array-camera images $I_k$. The virtual camera position is an input for the block diagram and represented by signal $C_0$. The diagram depicts an implementation according to expressions 13 and 14. Each image-shift over $(\Delta s_k, \Delta t_k)$ is performed by a convolution with a kernel $T_{\Delta s_k, \Delta t_k}$ defined according to expression 9.

FIGS. 9 and 10 provide for refocused images using the input data of an array of cameras, wherein the method has as inputs a virtual camera position RCC and the focus distance z.

It is remarked that in and by itself the methods illustrated in FIGS. 9 and 10, independent of further use of the resulting image data $I_0(s,t)$, provide for novel and inventive methods and systems in which such methods are used. A problem with camera arrays in general is the extremely small depth of field of the synthesized image. This is due to the large dimension of the synthetic aperture, which is determined by the dimensions of the camera array.

Figure 11:
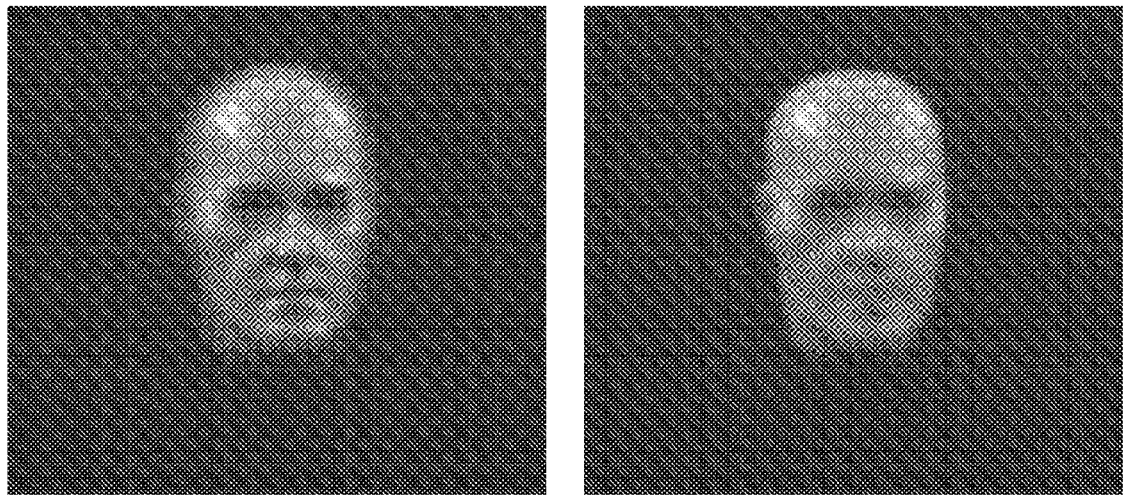
FIG. 11 shows images in which the lightfield data collected by means of an array of camera's are refocused on the nose (left) and the ears (right)

FIG. 11 show images in which the lightfield data collected by means of an array of camera's are refocused on the nose (left) and the ears (right).

It is clear that for each of the refocused image the Depth of Field (DoF) is too small for the entire head.

To obtain an image with sufficient Depth of field DoF one can use, as in the prior art, a cut-and-paste method, i.e. a photomontage method. However, to create an image with sufficient DoF, a depth model of the scene is required. With the depth map a refocus distance for each pixel in the output image is determined. Estimation of such a depth map is a computationally demanding task. Furthermore, the estimated depth map may not be sufficiently accurate, since small errors can cause very visible artefacts.

Figure 12:
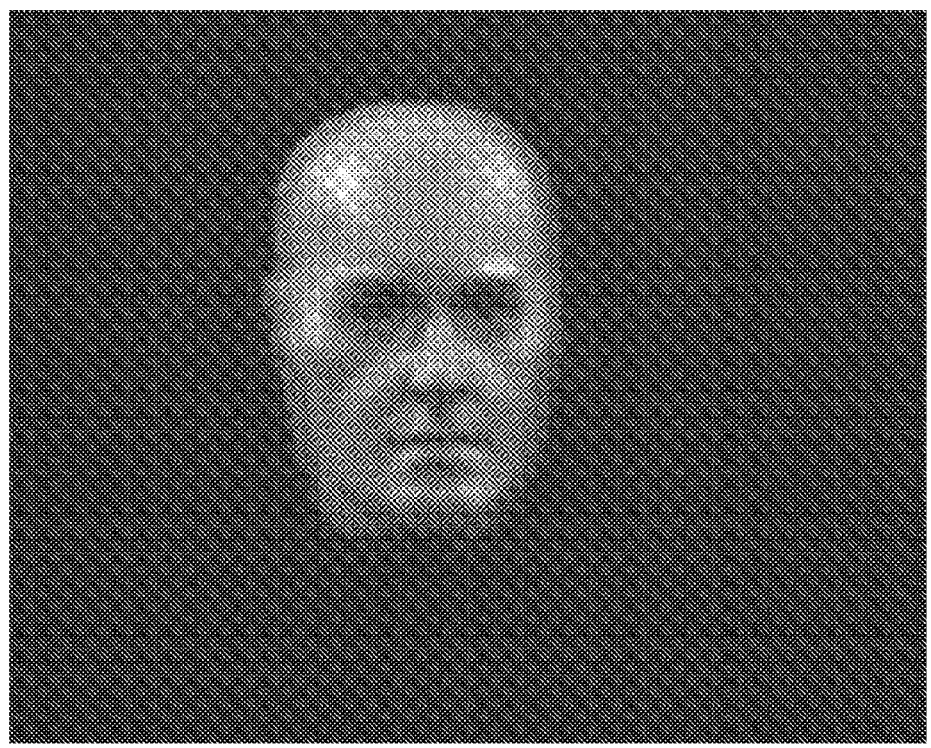
FIG. 12 shows an attempt to create an all-focus image with an estimated depth map

FIG. 12 shows an attempt to create an all-focus image with an estimated depth map. It is clear that even small errors in depth estimation cause visible artefacts.

The present invention takes another route enabling all-focus imaging.

The method of the invention deals with the limited depth of focus of the camera array, but it is neither based on explicit depth estimation nor based on an iterative classification of the focal stack data.

The method of the invention is based on the collective use of the integral accumulation of pixel values of each of the separate camera images as they would recombine during a focus variation. This particular use of specific accumulated pixel groups per camera image offers a computationally highly efficient way to synthesize camera images with a greatly extended depth of field. This allows a novel way of creating "all-focus" images with a camera-array. As explained above there is correspondence between a camera array and a plenoptic camera, so that the method is equally applicable to a plenoptic camera set-up.

The focus variation concept allows extending the depth of field, as explained below for a single camera. Consider a conceptual camera model consisting of a point source, lens and sensor. The lens focuses the light from the point source at the image plane. The position of the image plane depends on the distance between the point source and the lens. If the sensor plane coincides with the image plane then the sensor receives a sharp image. Otherwise, the image appears blurred on the sensor, see FIGS. 13 to 15.

Figure 13:
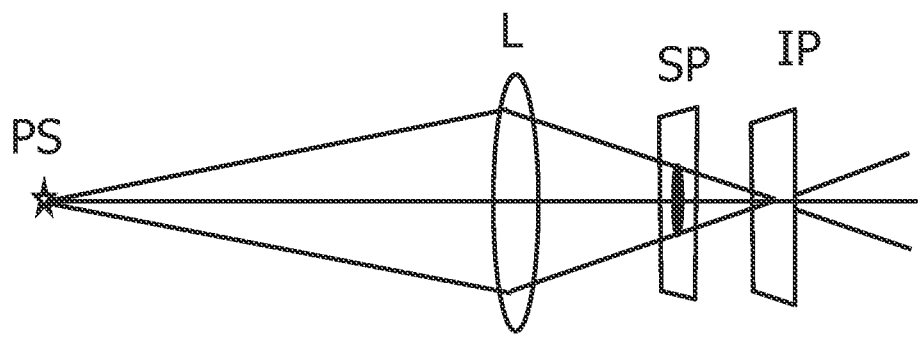
FIG. 13 shows blurring of the image due to defocus
Figure 14:
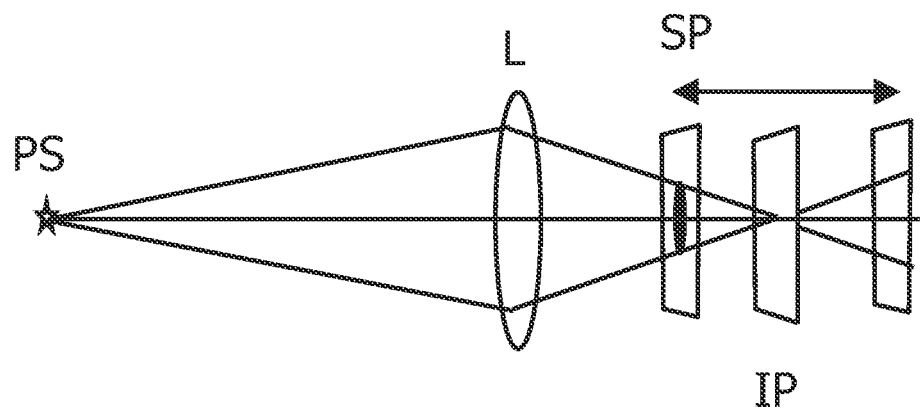
FIG. 14 illustrates a sweeping focus via changing the distance between the sensor and the lens
Figure 15:
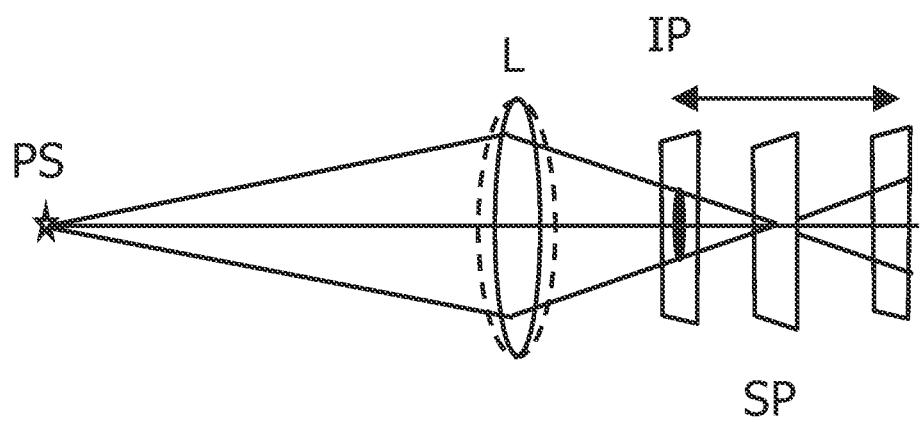
FIG. 15 illustrates sweeping focus via changing the focal length of the lens L

FIG. 13 shows blurring of the image due to defocus. The image plane IP for the point source PS as focused by the lens L does not correspond to the sensor plane SP. FIG. 14 illustrates a sweeping focus via changing the distance between the sensor and the lens. The sensor is moved from a position in front of the image plane to a position behind the image plane, thus sweeping the focus. FIG. 15 illustrates sweeping focus via changing the focal length of the lens L, the sensor lane SP stays at one position but, by changing the focal length of the lens L the image plane is moved from a position in front of to a position behind the sensor plane.

In traditional imaging, the position of the sensor is fixed so that only the objects at certain nominal distance appear sharply on the sensor. Objects at other distances will appear de-focused on the sensor, where the amount of de-focus blur is proportional to the distance between the sensor and the nominal image plane.

In a so called 'sweeping focus' camera, the sensor plane sweeps through a range of image planes during the exposure (FIG. 14) or alternatively the image plane sweeps through a range of positions around the sensor plane (FIG. 15). In contrast to the traditional camera there is no single distance at which an object can appear sharply on the sensor, as a mix of sharp and blurred data accumulates during the exposure. The accumulated blur causes all objects in the image to appear blurred, regardless the object distance. However, the accumulated blur appears to be virtually invariant to the distance of the objects in the scene. As a consequence, a single space-invariant inverse filter is sufficient to recover a sharp image from the accumulated blurred image. The objects in the recovered image now all appear sharp, regardless their distance to the camera.

In order to better understand how the sweeping focus camera blurs the image one can consider the imaging of a single point source at certain distance from the camera. Then, the dependence of the blurring effect from the distance to the object is considered.

Figure 16:
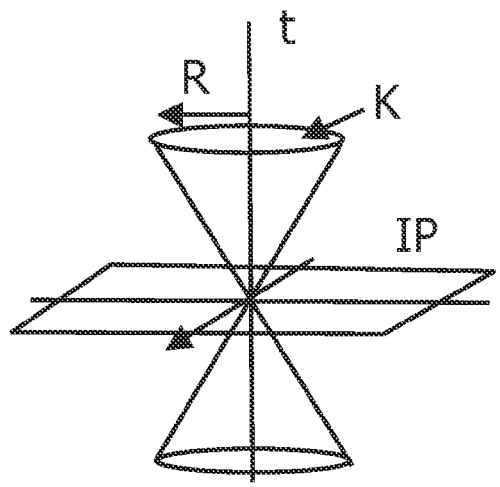
FIG. 16 illustrates a blurring diagram
Figure 17:
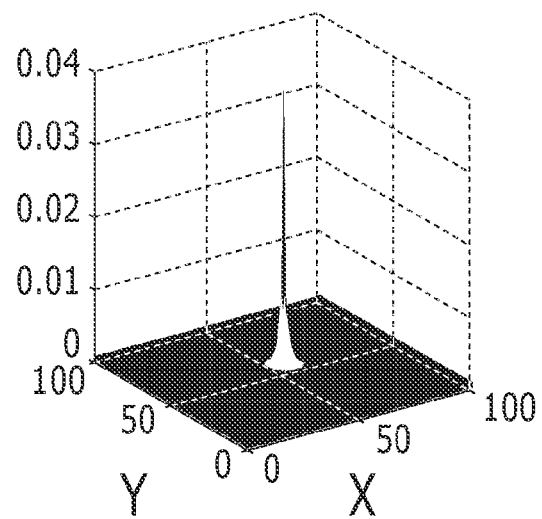
FIG. 17 shows the effective system blurring kernel FIG. 18 showing the same on a logarithmic scale
Figure 18:
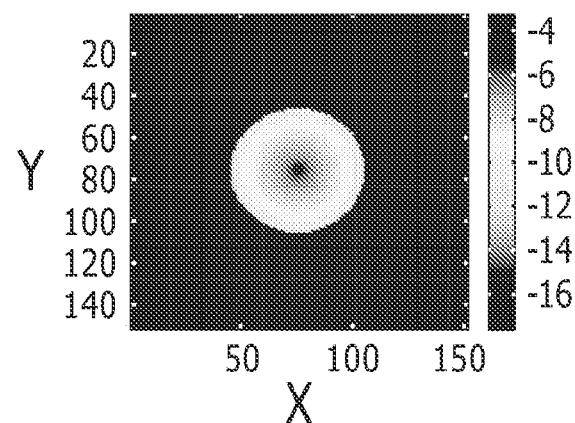

Below, two different implementations of the sweeping focus concept are considered. In the first one, the sensor translates along the optical axis, see FIG. 14. The second implementation comprises the use of a varifocal lens (preferably with fixed magnification) where the axial translation of the sensor is replaced by equivalent change in the focal length of the lens, see FIG. 15. In both implementations, the sensor sweeps through the image plane where the object is perfectly in focus. Thus, the object stays in focus only one instant of time and for the remaining acquisition time it is more of less defocused. The amount of de-focus is directly proportional to the distance between the sensor and the image plane (FIG. 13). Instant blurring can be represented as a convolution of the sharp image with a uniform kernel that has the shape of the lens aperture, which is in most cases a disk. When the sensor sweeps through the image plane, the blur kernel is scaled spatially. The radius of the kernel first decreases to (virtually) zero, at the position where the sensor plane and the image plane coincide, and then increases again. In the following a linear focus sweep is considered wherein the radius R of the blurring kernel K changes linearly with time t and where the starting and the ending blurring radiuses are equal. See FIG. 16. By looking on FIG. 16 one can find the blurring diagram has the shape of two cones pointing towards the image plane. The total blurring which the system produces on the sensor is a temporal integral over the disk kernels with linearly increasing radiuses. An illustration of this system kernel is given in FIG. 17 showing the effective system blurring kernel and FIG. 18 showing the same on a logarithmic scale. One can see that the shape of the system kernel is in-between the Dirac delta, corresponding to the sharply focused image, and the flat disk de-focus kernel of the traditional camera.

Clearly, the sweeping focus camera does not offer any benefits for the imaging of a single flat object at a known distance over the traditional camera, as in that case the best image is acquired by focusing the camera exactly at the single flat object. However, we will show in the following that the advantages become evident when the exact distance to the object is unknown or when there are several objects at different distances to the camera in the scene, such that the image requires sufficient depth-of-field to provide sharp images of all objects of interest. For a traditional camera, the amount of de-focus increases linearly with the distance to the image plane. Objects at one particular distance to the camera will be sharply imaged, but as the objects are further away or closer to the camera the blurring increases. Below we will show that the amount of blur in the sweeping focus camera design is much less sensitive to the variations in the object-camera distance, or in other words the blur is more or less the same for any object, whatever its distance from the lens.

Figure 19:
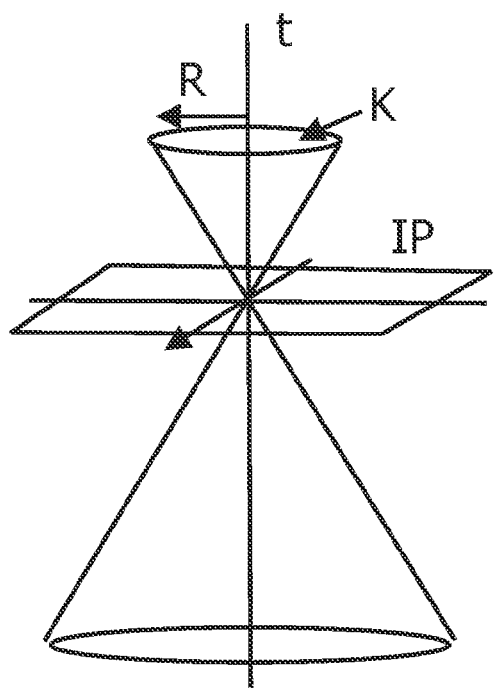
FIG. 19 illustrates a blurring diagram
Figure 20:
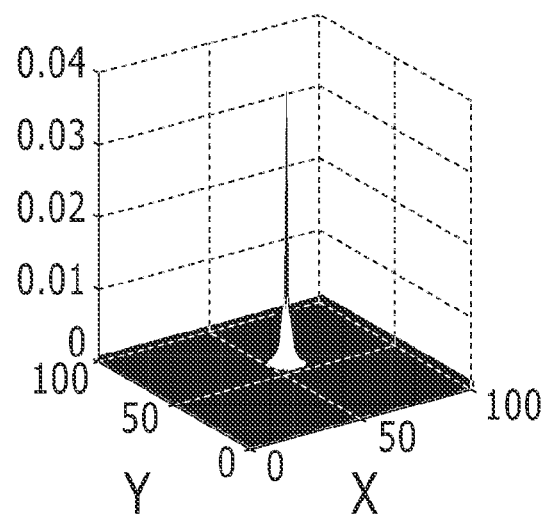
FIG. 20 shows the effective system blurring kernel FIG. 21 showing the same on a logarithmic scale
Figure 21:
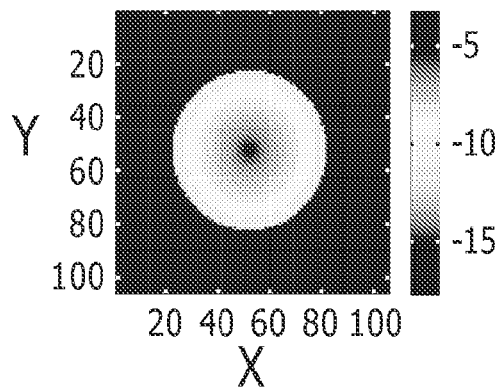

Consider the case when the distance to the object is different from the nominal but it is still covered by the sweeping range (i.e. the camera crosses through the objects image plane during the sweep, albeit not precisely half-way). This will lead to a temporal offset of the moment when the sensor will cross the actual image plane. Thus the shape of the dual-cone blurring diagram around the actual image plane will stay the same, but the starting and the ending blurring radiuses will be different, see FIG. 19. FIGS. 20 and 21 are similar to FIGS. 16 and 17 above showing the system kernel and the logarithm of the system kernel. The system kernel is the blurred image provided by a point source, thus function is also called the point spread function, i.e. how a point is spread out over the virtual output image.

We see that each object, regardless its distance to the camera, will appear at certain moment of time sharply focused and moreover, around this time, it will experience the same blurring effect. Note that the energy of the blurring kernels for each moment in time (horizontal slices in FIG. 18) is constant. When the object is close to its image plane, the filter energy is highly concentrated such that the moment of a sharp focus corresponds to a Dirac delta kernel. This part of the spatio-temporal integration area dominates the outcome of the temporal integral. Hence the object is blurred similarly on the sensor, irrespective of its distance to the camera. The small difference between the system kernels will affect only relatively middle-low spatial frequencies, leaving the picture details unchanged. The spectra of the sweeping focus kernels have very similar amplitude profiles.

One of the greatest advantages of the sweeping focus kernel is that its response has no 'zeros' in the frequency response such that its inverse operation exists for all spatial frequencies, the sweeping kernel thus allowing a well-defined and compact inverse filter. For a standard kernel this is not possible.

Figure 22:
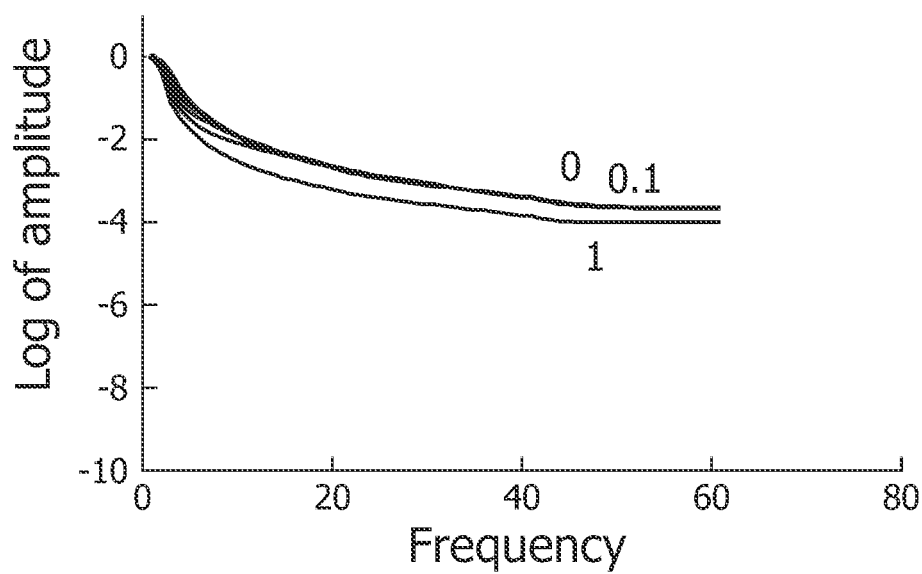
FIG. 22 illustrates the spectral properties of the kernels for a sweeping focus camera
Figure 23:
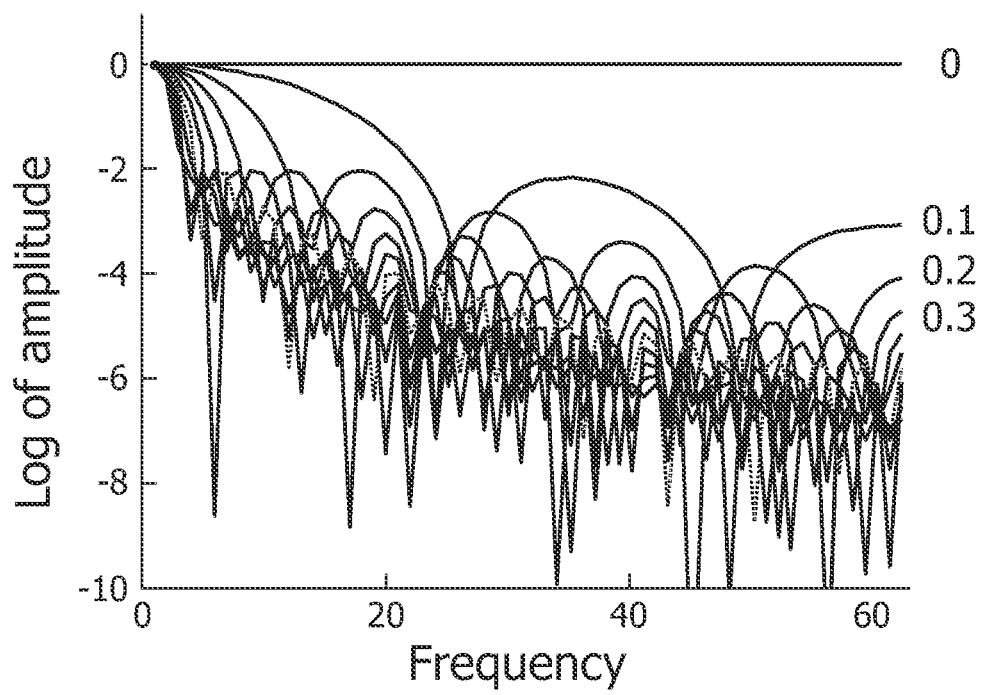
FIG. 23 shows the same for a traditional camera

FIGS. 22 and 23 illustrate this effect. FIG. 22 below illustrates the spectral properties of the kernels for a sweeping focus camera. Since the Fourier transforms of the two-dimensional kernels are isotropic for a circular aperture, FIG. 22 shows only the cross-sections of the transforms corresponding in a single spatial direction. The lines correspond to various. In the ratios between the offset and the amplitude of the sweeping range. FIG. 23 shows the same but then for a traditional camera.

One can see that the spectra of the sweeping focus kernels have very similar amplitude profiles while the amplitude profiles in traditional camera are quite different. In traditional cameras it is not possible to characterize the frequency behaviour of the kernel to any accuracy with a single function. In the sweeping camera it is possible to use a single function. This allows effective deconvolving.

Since the blurring effect in a sweeping focus camera barely depends on the actual camera-object distance, the images can be efficiently de-blurred using the same inverse filter, i.e. one and the same inverse point spread function, thus avoiding the necessity of local depth estimation.

As a consequence, it is possible to get very good results by processing the acquired integrated blurred image with the same inverse filter corresponding to the blurring kernel of objects focused halfway the sweep.

Figure 24:
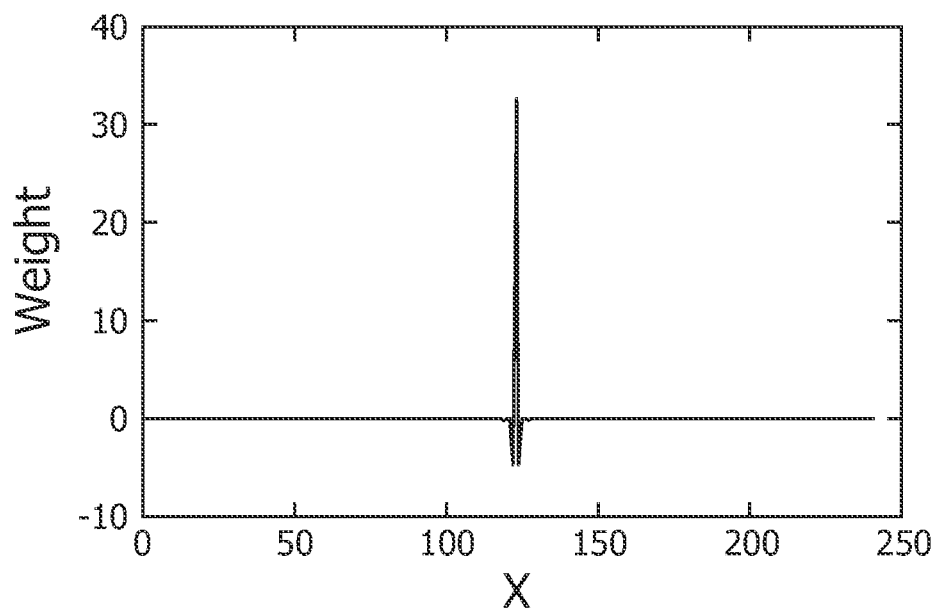
FIG. 24 illustrates a cross-section of the inverse filter for the sweeping focus kernel

FIG. 24 illustrates a cross-section of the inverse filter for the sweeping focus kernel corresponding to the camera that sweeps through the blurring radiuses between zero and thirty pixels.

Figure 25:
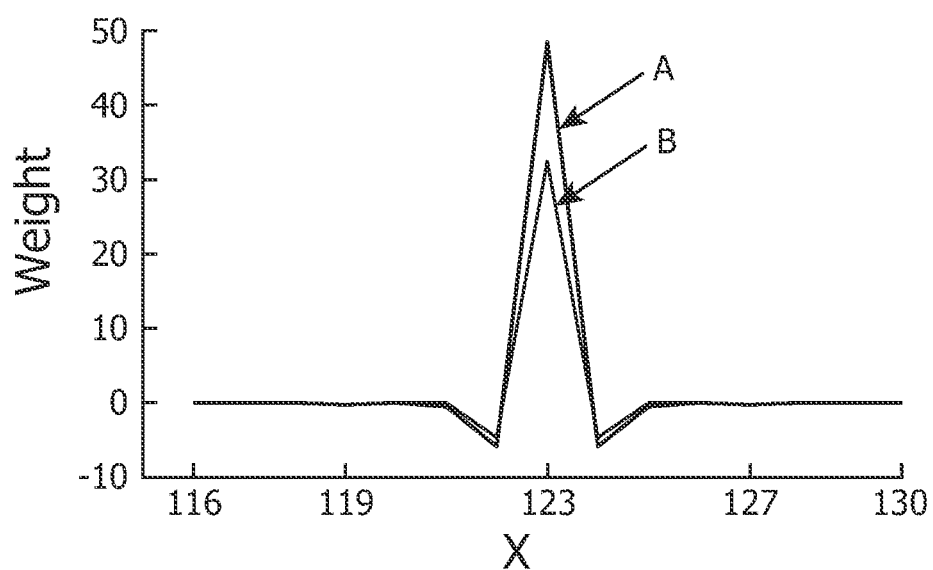
FIG. 25 shows the inverse filters corresponding to the object offsets from the nominal object plane up (line A) to 0.8 of the sweeping amplitude (line B)

FIG. 25 below confirms this by showing that the inverse filters corresponding to the object offsets from the nominal object plane up (line A) to 0.8 of the sweeping amplitude (line B) are practically the same.

The above explains the sweeping focus approach. The inventors have realized that the same positive effects can be obtained using a camera array.

The inventors have realized that with a plenoptic camera, and as explained above thus also with an extended array of camera's, it is possible to generate numerically a stack of refocused images. A stack of refocused images is mathematically the same or very similar to an image taken by a sweeping camera. Refocusing amounts to shifting and adding the various images of the array of image capturing devices as explained above e.g. in FIGS. 9 and 10. The shift, as explained above is proportional to the position of the plane at which the refocusing is made and to the distance between the particular image capturing device and the point of view. Thus, providing a stack of refocused images is conceptually the same as or similar to a focus sweep action.

One can integrate the focal stack to provide an integrated image just as would be made by the sweeping focus approach. Such an integrated image will be severely blurred. For each of the refocused images only a part of the image is in focus, namely that part of the object that is present in the plane of focussing, the rest of the object is out of focus. Integrating the focal stack, i.e. adding all data together will provide an image that is everywhere blurred with substantially the same system kernel, i.e. substantially the same point spread function. One can then use the same inverse point spread function to deconvolve the image and get a synthetic all-focus image, just as with the sweeping focus approach.

An additional advantage that is used in the present invention, by using an array of cameras (which cannot be obtained by a single camera, since a single camera has a fixed position), is that one can also choose a virtual camera position, i.e. construct an all-focus image from a virtual camera position. This is an advantage that a sweeping focus camera, which has a fixed position, does not provide.

The integrated image can be deconvolved with a single point spread function (PSF). This deconvolving results in an image that is in focus over the integrated range, i.e. over the depth of field range of the focal stack. The DoF is greatly improved, while not requiring a depth map to be estimated. The point spread function is also called the impulse response function. The point spread function provides the smear of the impulse function. Any image of an object is the result of a convolution of the object data and the impulse function. The blurred image of an object in the image made by integrating the focal stack is the result of a convolution of the object and the response function of the refocusing and integration.

One computational simple way of deconvolving is to make use of the fact that, expressed in Fourier space, the Fourier transform of a convolution of a first and a second function is the product of the Fourier transform of the first function and the Fourier Transform of the second function. So, deconvolving amounts to dividing the Fourier transform of the blurred image, said image being formed by the convolution of the object and the point spread function, by the Fourier transform of the point spread function. One then obtains the Fourier transform of the object. The 'cleaned up"-image of the object is then E obtained by applying an inverse Fourier transform to the resulting function. An unblurred image of the object (apart from blur due to calculation, since one has to apply Fourier transforms, divide functions and apply a reverse Fourier transform) results.

As an example a system comprising four camera's around a display screen may be taken.

Figure 26:
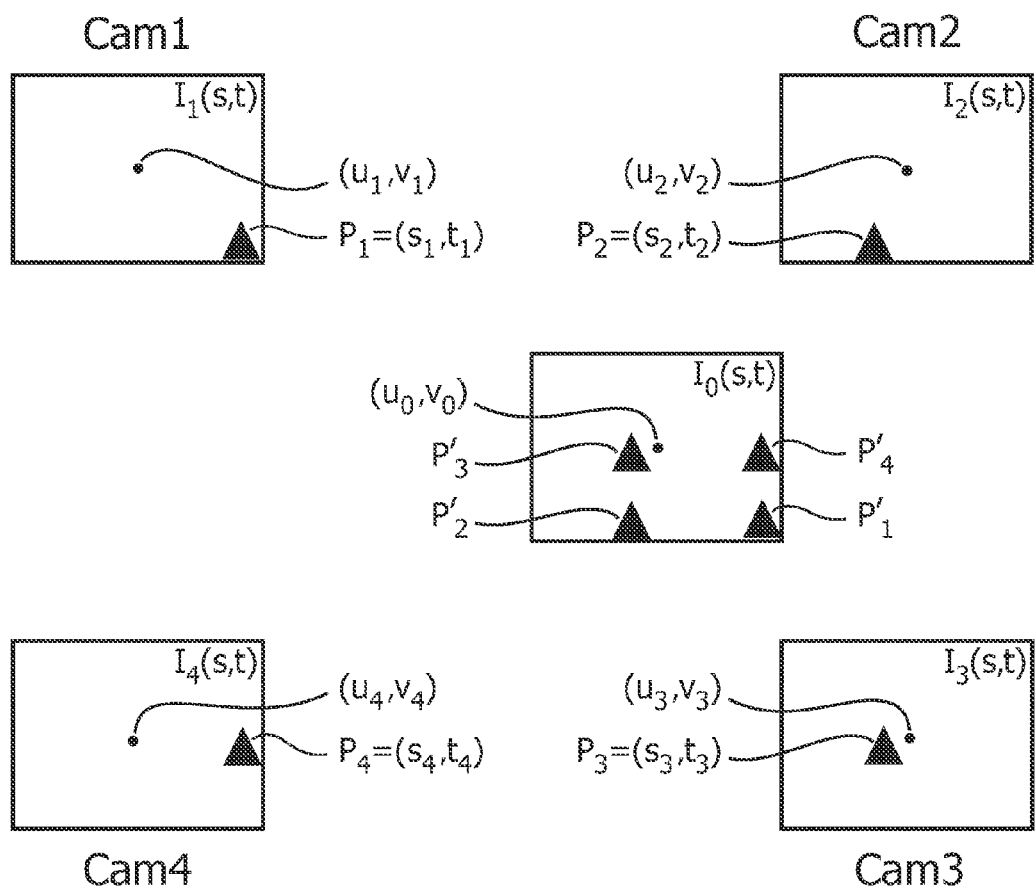
FIG. 26 schematically depicts images of an array with four cameras
Figure 27:
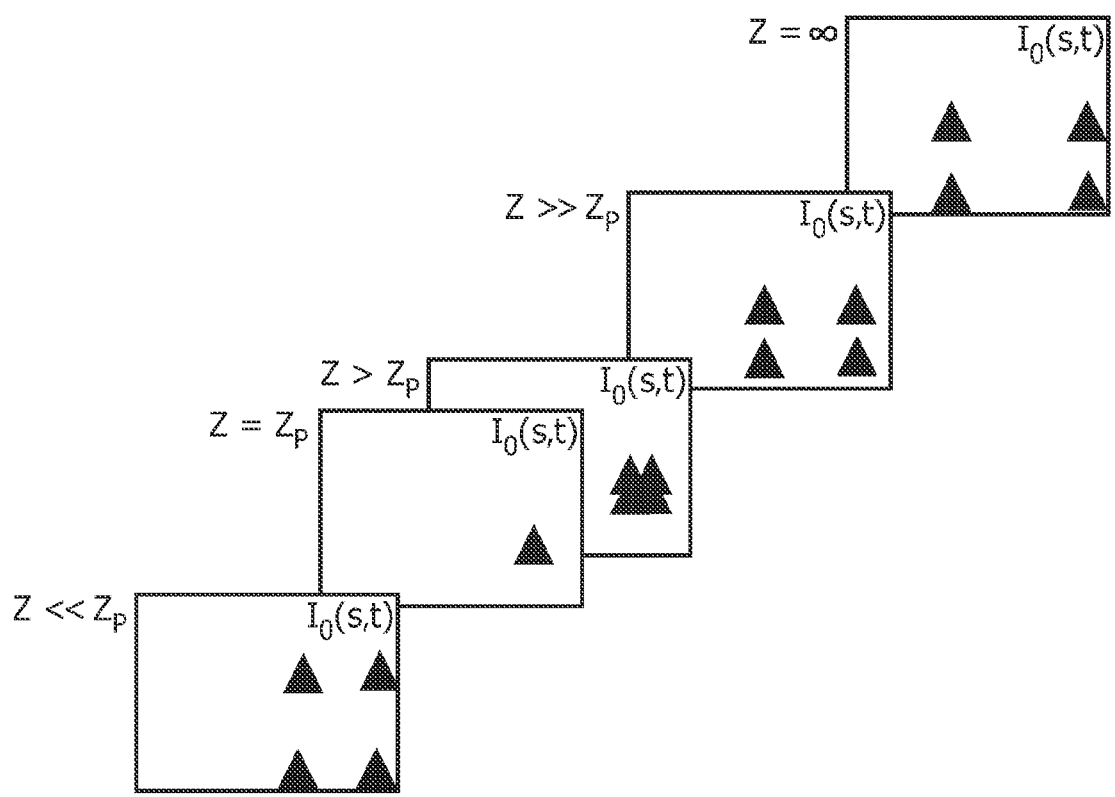
FIG. 27 illustrates the effect of synthetic refocusing on the position of the individual camera contributions to the output image

In a normal camera, the defocus blur can be considered to be a linear accumulation of light rays from the entire aperture area. In a similar way, a synthetically focused image of a camera array results from a linear accumulation of the separate images. The entire array functions as a single camera with an aperture that has the size of the array and the shape of the camera pattern. In the case of a peripheral-camera array, the aperture is a collection of dots, distributed along the outline of a rectangle. Objects that are not in the synthetic focal plane are blurred with this discretized kernel and produce an accumulation of discrete copies of the object in the shape of a rectangle. This situation is illustrated in FIG. 26 and FIG. 27, FIG. 26 is a schematic depiction of the images of an array with four camera images $I_1$, $I_2$, $I_3$ and $I_4$, and a synthetically focused image $I_0$ at a virtual camera position $C_0$. The coordinates (s,t) indicate the position of the object (triangle) in each camera frame, the coordinates (u,v) indicate the positions of each camera centre (circle) within the plane of the camera array. The depicted virtual-camera at a position $(u_0,v_0)$ image would follow from an accumulation of the four input images without shifting the images. Not shifting the images amount to synthetically focusing the virtual-camera image is at infinity. The triangle depicts the position of an object in the image taken by camera 1, 2, 3 and 4. $P'_1$, $P'_2$ etc depicts the position of said object in the output image as an accumulation of all four images. The virtual camera position is an input for the figures.

FIG. 27 illustrates the effect of synthetic refocusing on the position of the individual camera contributions to the output image. The true distance object distance of point P is indicated by $z_p$. From top to bottom the synthetic focus distance z is set to infinity (z=∞), (much) larger than the object distance, equal to the object distance (z=$z_p$), at which focus distance the four images coincide, and smaller than the object distance. Instead of the familiar defocus blur, an incorrectly focused object appears as multiple superimposed copies.

Figure 28:
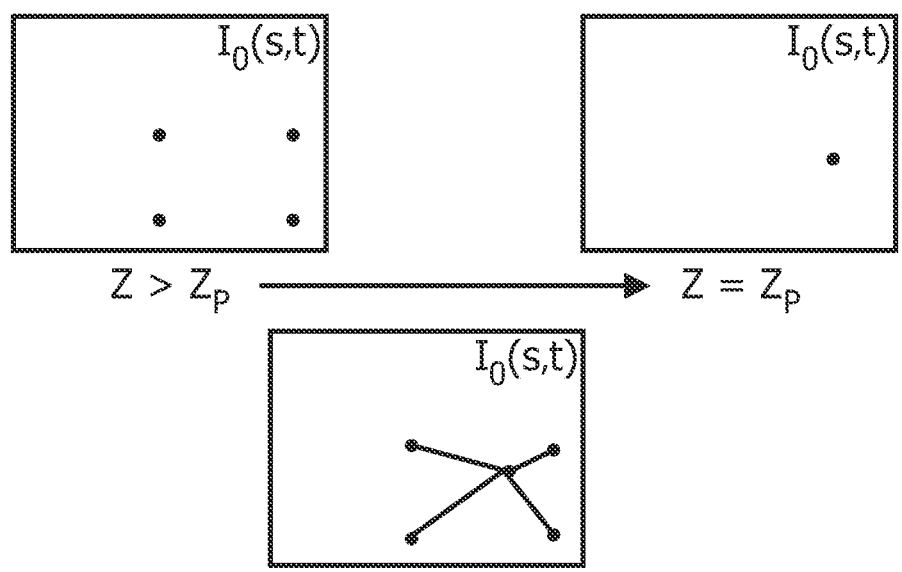
FIG. 28 shows the output image resulting from a synthetic focus sweep

When we synthesize the process of a focal sweep with the images from a camera array, the discrete nature of the aperture results in integration of the images of the superimposed copies. This is illustrated in FIG. 28 illustrates the output image resulting from a synthetic focus sweep from over a synthetic focus distance $z > z_p$ for a point source, down to the true object distance $z = z_p$. The system kernel is formed by four lines converging to a single point at $z = z_p$. For a sweep from $z_p < z$ four lines diverging from a single point would be the result. The accumulative point spread function is a function of the virtual camera position $(u_0, v_0)$, the number and positions of the cameras in the array of cameras $(u_1, v_1; u_2, v_2, \text{etc})$ and the sweep $z_{min}$ to $z_{max}$. For six cameras, the accumulative point spread function would have six 'arms', for eight camera eight etc.

Figure 29:
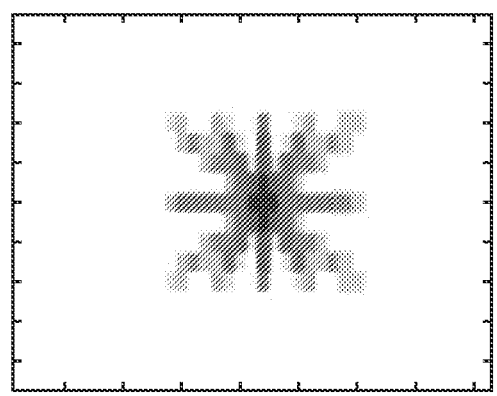
FIG. 29 shows the resulting accumulative point spread function for a 12 camera array

FIG. 29 shows the resulting accumulative point spread function for a 12 camera array with discrete focal steps wherein the virtual camera position is very near the centre of the display screen.

For each virtual camera position and each array of cameras an accumulative point spread function can be established.

Just as for the focus sweep approach the point spread function will not be much dependent on the actual distance of the object and a single inverse point spread function can be used for deconvolving the image which is with a high degree of accuracy accurate for all points.

Figure 30:
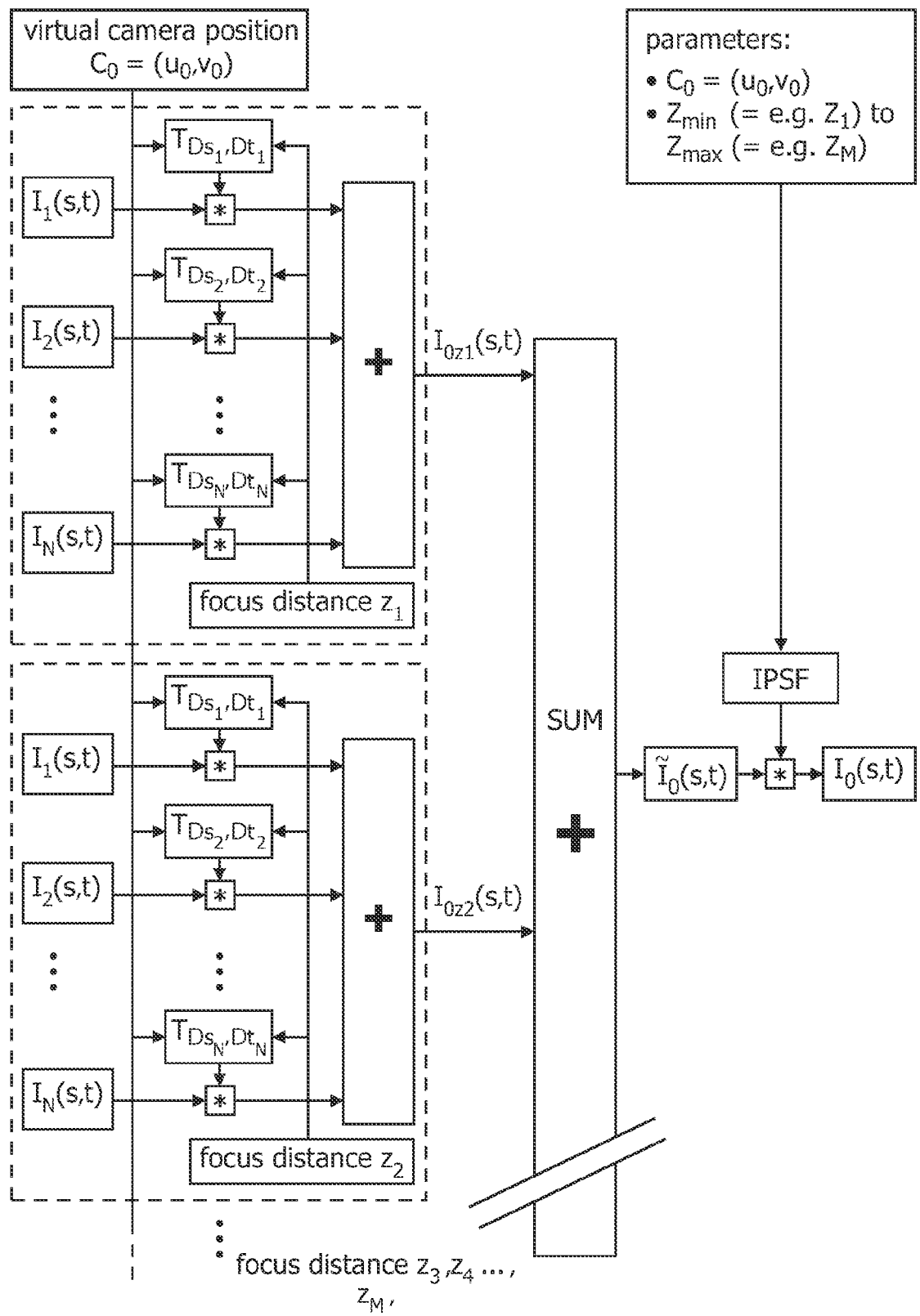
FIG. 30 illustrates a block diagram for calculating an all-focus image

The process of calculating an output image with the result of a synthetic focal sweep can be calculated in various ways. A first implementation would be to step through a number of focal distances and perform the calculation as depicted schematically in the Block diagram of FIG. 30. The virtual camera position is an input for the block diagram and represented by signal $C_0$, representing the virtual camera position $u_0, v_0$. Here, an accumulation of differently focused images is obtained by stepping through a range of synthetic focus-distance values between the closest distance $z_{min}$ and the furthest distance $z_{max}$ using sufficiently small increments. In FIG. 30 the separate discrete distance values are indicated by indexed values $z_1, z_2,$ to $z_M$. The parts of the Block diagram in rectangles with dotted lines represent a scheme as depicted in FIG. 10 for providing a synthetically focused image. $I_{0z1}(s,t)$ stands for a synthetically focused image at focus distance $z_1$, $I_{0z2}(s,t)$ stands for a synthetically focused image at focus distance $z_2$, etc.

$\tilde{I}_0(s,t)$ stands for the accumulation of synthetically refocused virtual-camera images, which is performed in summer SUM. This is a severely blurred image. However, as explained above by deconvolving this severely blurred image with an point spread function a synthetic all-focus image can be obtained. $\bar{I}_0(s,t)$ stands for the final synthetic all-focus image, IPSF is the inverse of the accumulative point spread function.

The parameters determining the accumulative point spread function are the virtual camera position $C_0 = (u_0, v_0)$ and the synthetic focus range $z_{min}$ to $z_{max}$. This synthetic all-focus image, herein also called the virtual output image is usually in the form of a data signal. This data signal can be sent to image display devices, or image data treating devices. To the virtual output image data signal additional information can be added, e.g. as meta-data or in the form of flags. Such additional data preferably comprises in embodiments the virtual camera position and/or the gazing direction. The image of a person taken from an off-centre virtual camera position can be almost indistinguishable from an image taken from a person seated off-centre with respect to the array from a central virtual camera position. By providing associated or within the data signal information on the virtual camera position $C_0$ a distinction can be made. Further additional information can be the arrangement of the cameras within the array.

FIG. 30 shows a more or less brute-force calculation of a synthetic focal sweep by accumulation of a range of M synthetically refocused images. There are various embodiments to convert to, many of which result in a linear operation. For simplicity, depicted here is the conversion using a convolution with the inverse of the accumulative PSF.

The first implementation would be to step through a number of focal distances and perform the calculation as depicted in FIG. 30. Here, an accumulation of differently focused images is obtained by stepping through a range of synthetic focus-distance values between the closest distance $z_{min}$ and the furthest distance $z_{max}$ using sufficiently small increments. In FIG. 30 the separate discrete distance values are indicated by indexed values $z_1, z_2,$ to $z_M$. The accumulated sum of synthetically focused images for all calculated distances is indicated by $\tilde{I}_0$; this is accumulated image after the synthetic focal sweep. Using the convolution based translation of expression (13), the accumulated image after a synthetic focus sweep follows from $$\tilde{I}_{0,z}(s,t) = \sum_{z=z_1}^{z_M} I_z(s,t,u_0,v_0) = \sum_{z=z_1}^{z_M} \sum_{k=1}^{N} (I_k * T_{\Delta s_k, \Delta t_k})(s,t), \quad (15)$$

$$\forall (s,t),$$

with $T_{a,b}$ our translating impulse response function, defined earlier in expression (9) and repeated below $$T_{a,b}(s,t) = \delta(s-a)\delta(t-b), \quad (9)$$

and with the translation vector, as defined earlier in (14) and repeated below, $$(\Delta s_k, \Delta t_k)^T = -\frac{f}{z}(u_k - u_0, v_k - v_0)^T. \quad (14)$$

Using the convolution-based implementation we construct a block diagram as depicted below.

Provided that we use sufficient synthetic focus distance values z, the accumulative PSF typically adopts a "star" shape, as depicted in FIG. 28, with as many spokes as there are cameras in the array.

The all-focus reconstruction $\bar{I}_0$ can be obtained from $\tilde{I}_0$ in various ways. Depicted in FIG. 30 is the convolution with the linear filter with the inverse frequency response of the effective PSF of the sweeping-focus camera array.

FIG. 28 depicts how a synthetic focal sweep results in an output image in which the contribution of a single point in space at a certain distance is projected as a straight line. Each line corresponds to a single array-camera. As such each line forms a contribution to the accumulative PSF of the synthesized focal-sweep system. The calculation of a virtual camera image on the basis of a synthetic focal sweep is completely linear. This means that we can change the order of various operations without changing the result of the calculation, $$\tilde{I}_{0,z}(s,t) = \sum_{z=z_1}^{z_M} \sum_{k=1}^{N} (I_k * T_{\Delta s_k, \Delta t_k})(s,t) = \sum_{k=1}^{N} \left( I_k * \left[ \sum_{z=z_1}^{z_M} T_{\Delta s_k, \Delta t_k} \right] \right)(s,t), \quad (16)$$
$$\forall (s,t),$$

with $T_{a,b}$ our translating impulse response function defined in (9).

Each camera image $I_k$ is now convolved with the sum of translating impulse response functions, essentially forming a line of delta-functions. As the synthetic sweep needs to approximate a continuous variation in focus, the sum of translating impulse response functions forms a continuous line which can treated as a single impulse response $$S_{\Delta s', \Delta t', \Delta s'', \Delta t''} \quad (17)$$

$$S_{\Delta s', \Delta t', \Delta s'', \Delta t''} = \sum_{z=z'}^{z''} T_{\Delta s_k, \Delta t_k},$$

where the start and end points, resp. vectors $(\Delta s_k', \Delta t_k')^T$ and $(\Delta s_k'', \Delta t_k'')^T$ are defined by the start and end values, resp. z' and z" of the synthetic focus range, $$(\Delta s_k', \Delta t_k')^T = -\frac{f}{z'}(\Delta u_k, \Delta v_k)^T \text{ and} \quad (18)$$
$$(\Delta s_k'', \Delta t_k'')^t = -\frac{f}{z''}(\Delta u_k, \Delta v_k)^T.$$

As a focal sweep, either physical or synthetic, is a continuous process, a more exact expression for our line-shaped convolution requires the use of a Riemann integral, $$S_{a',b',a'',b''}(s,t) = \int_{a'}^{a''} \int_{b'}^{b''} \delta\left( \frac{s-a-a'}{a''-a'} - \frac{t-b-b'}{b''-b'} \right) db\, da, \quad (19)$$

Figure 31:
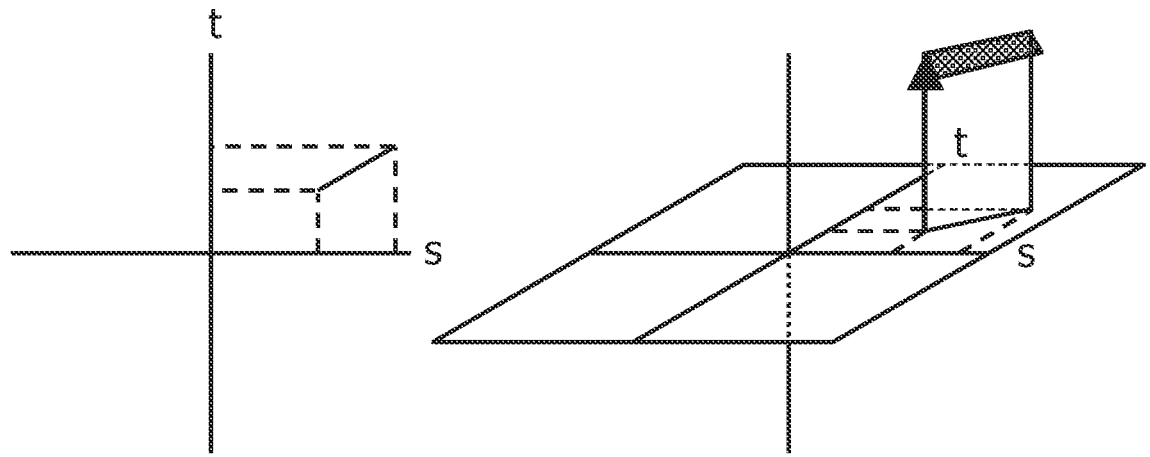
FIG. 31 illustrates a filter kernel

Thus, whereas in FIG. 30 a Block diagram is shown in which the starting point are the data from the individual cameras of the array, and a number of synthetically focussed images $I_{ozik}(s,t)$ are made, which are then summed to produce $\tilde{I}_0(s,t)$, one can also convolute the image data of the cameras of the array with the line shaped convolution as shown in FIG. 31. Using a line shaped convolution amounts in fact to a method that is equivalent to using an infinite number of refocused images in the stack so that the latter method of using a path S is in fact, as clarified above, mathematically equivalent to using an infinite number of synthetically focussed images. Although mathematically equivalent, the speed of calculation increases since each image can be directly convoluted.
Where the path S is a sum of translating impulse functions the method is equivalent to using a stack of refocused images.

Using a path convolution increases the speed of calculation.

FIG. 31 depicts the filter kernel defined in expression 19.

Figure 32:
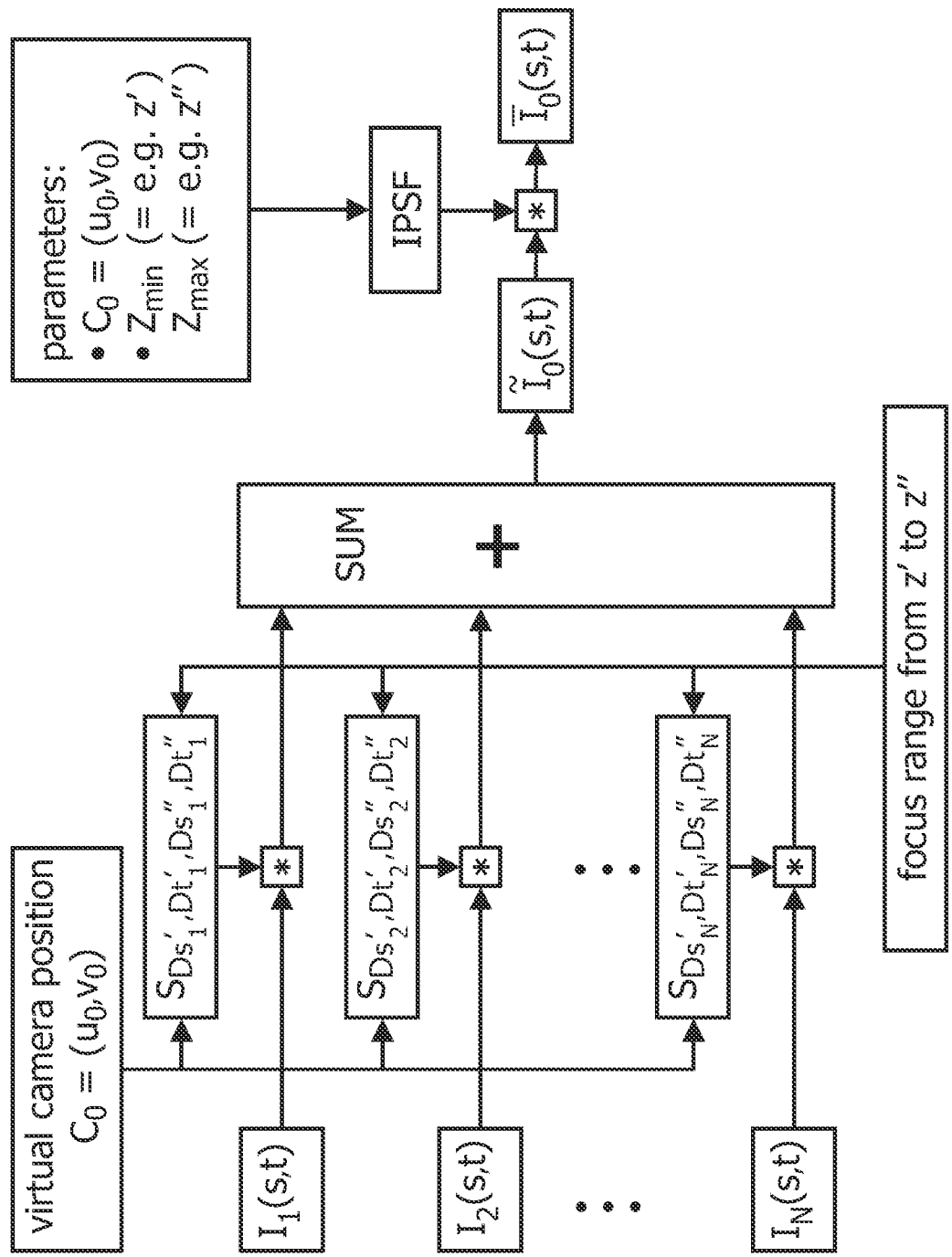
FIG. 32 shows a block scheme of a fast exact implementation of the method

FIG. 32 shows a block scheme of this fast exact implementation.

FIG. 32 shows an efficient calculation of a synthetic all-focus image $I_0$ that is synthetically focused at a continuous range of distances z, from z=z' to z=z". There are various embodiments to convert $\tilde{I}_0$ to $I_0$, many of which result in a linear operation. For simplicity, depicted here is the conversion using a convolution with the inverse of the accumulative PSF.

The first embodiment schematically shown in FIG. 30 can be described as follows:

1. Create a focal stack ($I_{oz1}(s,t)$, $I_{oz2}(s,t)$, etc) by repeatedly refocusing lightfield data from an array of cameras (or from a plenoptic camera).

One technique to refocus lightfield data to a specific depth is to shift the individual camera images in proportion to their distance from the viewpoint, and then add the shifted images together. This is repeated for each separate focus distance.

2. Integrate the focal stack (sum along the depth direction) forming $\tilde{I}_0(s,t)$ 3. Generate point spread function (PSF), e.g. by performing steps 1 and 2 to images containing a unit pulse δ, and integrating the focal stack.

4. Deconvolve integrated image of step 2, using PSF from step 3, e.g. with a direct division in the FFT domain, or another deconvolution method, such as Wiener or Lucy-Richardson deconvolution.

This first embodiment is very useful, but requires a large computational power.

However, the calculation of virtual camera image containing a synthetic focal sweep is completely linear. This means that we can change the order of various operations without changing the result of the calculation, as explained above.

Instead of generating a full focal stack and then integrating, we can directly generate the integrated image thereby saving on the number of computations as illustrated in FIG. 32.

In such embodiments one can reorder the computation as follows:

a. Generating projected path of the image shift for each image capturing devices of the array (equation 19)

b. Convolving the individual images with their respective projected path to provide convolved images $I_{conv1}(s,t)$, $I_{conv2}(s,t)$.

c. Adding convolved images to form an integrated image. The intermediate result is now identical to steps 1 and 2 of the previous embodiment. As explained above this is no coincidence, the two embodiments are mathematically equivalent, they express mathematically the same calculation, the order of various operations has been altered, without changing the result of the calculation. However, the latter method, especially when the path is a continuous function is faster and more accurate.

d. Generating a point spread function by integration of the projected paths (equation 17)

e. Deconvolving the integrated image, using the inverse point spread function with e.g. a direct division in the FFT (Fast Fourier Transform) domain, or another deconvolution method, such as Wiener or Lucy-Richardson deconvolution.

The integrated image provided in step c of this second embodiment corresponds to the integrated image of step b in the first embodiment, i.e. it corresponds to an image produced by integrating a stack of re-focussed images at various depths (even though the full focal stack itself has not been made).

Figure 33:
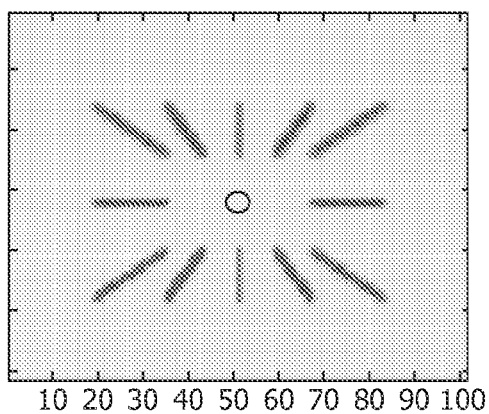
FIG. 33 shows projected paths PP for 12 camera positions around two virtual viewpoints and the corresponding Point spread functions PSF
Figure 33:
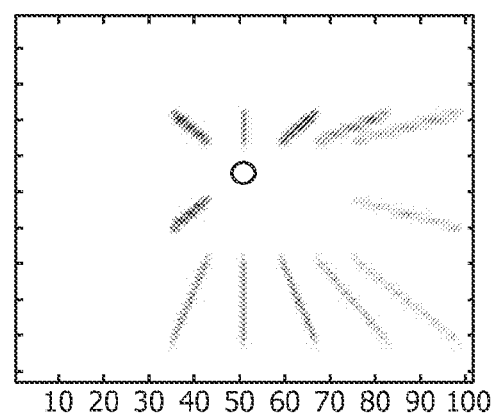
Figure 33:
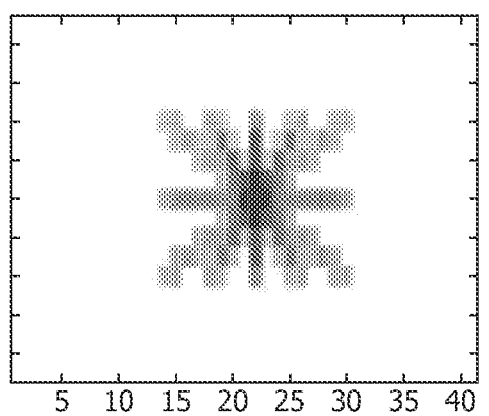
Figure 33:
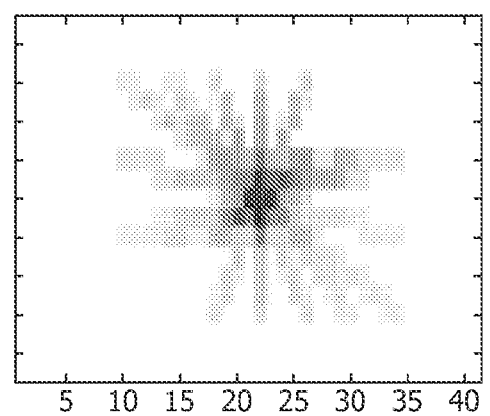
Figure 33:
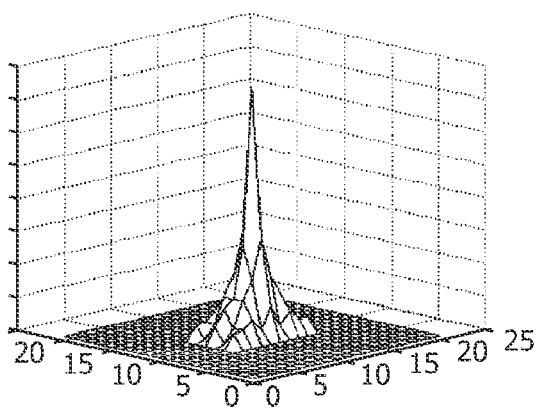

FIG. 33 illustrates projected paths PP for 12 cameras, for a central virtual camera position, left hand graphs, and a non-centred virtual camera position, right hand graphs. The virtual camera positions are indicated with a circle. The integral over each path is equal, thus a shorter path has higher amplitude. FIG. 33 also illustrates the point spread functions PSF for the two virtual camera positions, and finally at the left hand side, lower most part an isometric view of a point spread function for a centred virtual camera position. One can see that the virtual camera position is defined with respect to the array of cameras, and the paths are with respect to the virtual camera position.

Instead of generating a full focal stack and then integrating, the individual images from the image capturing devices of the array are convolved with their respective projected paths. The resulting generated image is the image as if a full focal stack would have been made and then integrated. The method according to the second embodiment strongly reduces, compared to the first embodiment, the number of required computations. The second embodiment illustrated in FIG. 32 provides for an alternative, less computer power demanding, route to providing an image corresponding to producing an image by integrating a stack of re-focussed images at various depths as illustrated in FIG. 30. The next step, deconvolution using the inverse point spread function IPSF is part of both the first and second embodiments. Because the second embodiment requires less computing power, it is of particular relevance for systems or apparatuses or circumstances in which this is of importance. Real time applications form one of them, since the times between images is limited. This method also, due to its speed is in particular suited for 3D applications. The virtual camera position $u_0, v_0$ is an input for the method and can be chosen to be any position. Thus, it is also possible to create two images from a slightly different camera position, thereby creating all-focus left and right eye images. This is true for any of the embodiments of the invention, but embodiments in which less processing power is required are even better suited. Two or more all-focus images from different camera positions can be created from the same data from the same array of cameras. This could be done by parallel processing the same data.

In embodiments in which the array comprises a relatively large number of cameras, in embodiments the array is split into two sub-arrays, for providing images from different points of view. For instance in embodiments in which the array has 16 cameras, 8 of them can be used to create an all-focus image from a 'right-eye' camera position, and 8 of them to create an all-focus image from a 'left eye'-camera position. Alternatively, in embodiments wherein the cameras record images with a high frame rate, odd frames can be used to create one type of images, whereas even frames are used to another type.

FIGS. 30 and 32 provide schemes in which an image corresponding to a focal stack is produced. This image is then deconvolved. The point spread function used is a dependent on the chosen camera position and the focus range.

The point spread function can be calculated for each virtual camera position $u_0, v_0$ and focus range ($z_{min}$ to $z_{max}$), or alternatively, tables can be used in which parameters for point spread functions are given as a function of virtual camera position and focus range.

In embodiments wherein the cameras used are also a parameter, the point spread function is a function of the cameras used. A choice of cameras to be used can be useful for a number of applications:
  left-right images in which a sub array is used for generating one of the images, and another sub array for the other.
  High definition-low definition wherein the number of cameras used can be chosen to create images of defined sharpness. This can be advantageous to balance required computational power and available computational power.
  To account for the malfunctioning of one or more of the cameras. If the array comprises x cameras and the point spread function assumes that all cameras are in function the loss of data of one of the cameras will lead to a point spread function not entirely correct. Where a large number of cameras is used this probably will not lead to an appreciable loss in image quality. However, by checking the functioning of the cameras and adopting the point spread function to the cameras in use, a better result can be obtained in case of malfunctioning of one or more of the cameras.

The system in any of its embodiments can generate output images at higher resolution than the individual cameras of the array. To benefit from additional sharpness, the camera images preferably exhibit sampling alias. These camera images are then upscaled by means of pixel repetition. The rest of the system is equal to one of the other embodiments.

We have verified our reconstruction methods using a camera mounted on an X-Y stage. With this setup we can evaluate the optimal number and placement of the cameras. Below are some sample images from our current implementation. This allows getting high resolution images from an array of relatively low resolution camera images. The difference with the schemes of FIGS. 30 and 32 (or any other scheme) is that prior to inputting the image data, the camera images are upscaled by pixel repetition, thus for instance making a 1024*1024 data into a 2048*2048 pixel array, wherein each pixel is doubled. The resolution increase for each individual camera is of course fake, but the effect in increase of resolution in the final image is real.

In the above examples the virtual camera position $u_0$, $v_0$ is chosen. The concept of the light field allows, apart from choosing the virtual camera position, also choosing the gaze direction. The total information from the array of camera can be rearranged so that to each camera of the array a virtual camera is assigned that looks into a specific gazing direction, i.e. a transformation is applied to the data to create the image data for camera looking into a particular gazing direction. These camera data are then the input for the schemes as illustrated in FIGS. 30 and 32. The result is that the synthetically focused images are constructed under an angle with the area, or in other words the focal stack has a gazing direction and that the resulting image is an image from a virtual camera position looking into a chosen gazing direction.

Above it is described how to synthesize images for a virtual camera position. Herein below some methods to determine or choose the position of a virtual camera is given and systems in which use is made of the possibilities of the invention.
Microscopy:
  The virtual camera is initially placed in the centre of the view. The position can then be modified under user control. (to look 'around' an object). In these systems the system comprises a means for input of the virtual camera position.

In combination with a 3D capable screen, it is preferable to generate two (or more) views thereby providing stereopsis. Preferably the user can adjust the amount of separation between the views to optimize the 3D effect. In these systems the system comprises an input for generating the difference between two virtual camera positions.

Figure 34A:
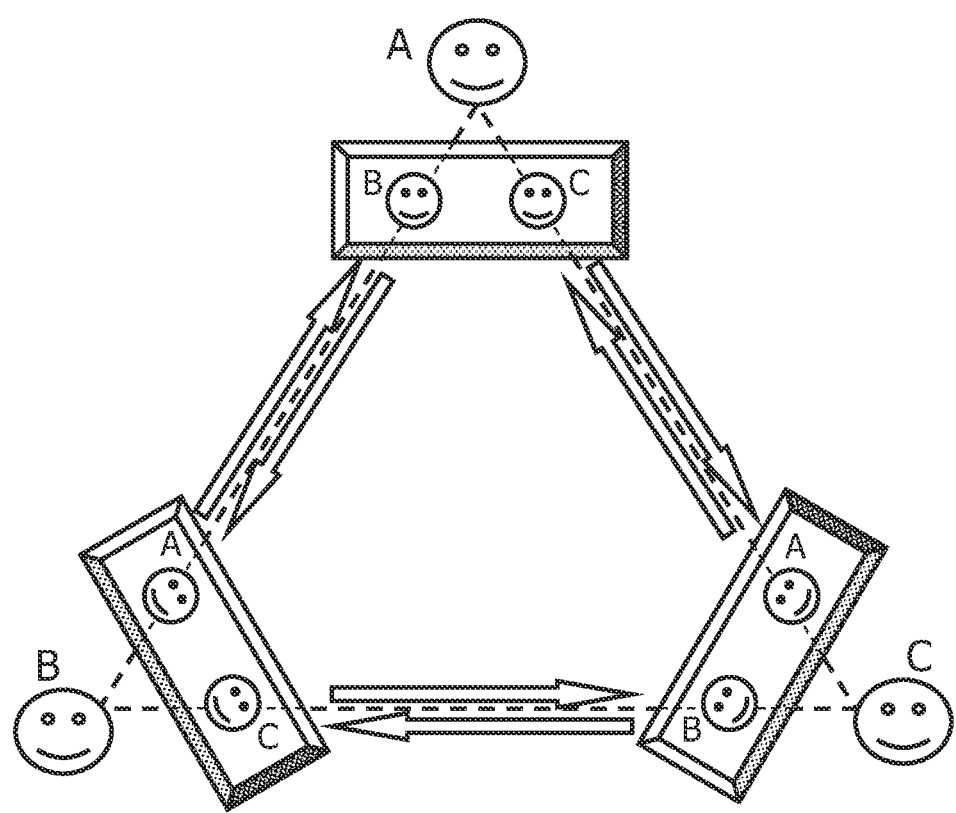
FIG. 34A to 34B illustrate a multi-user system according to the invention
Figure 34B:
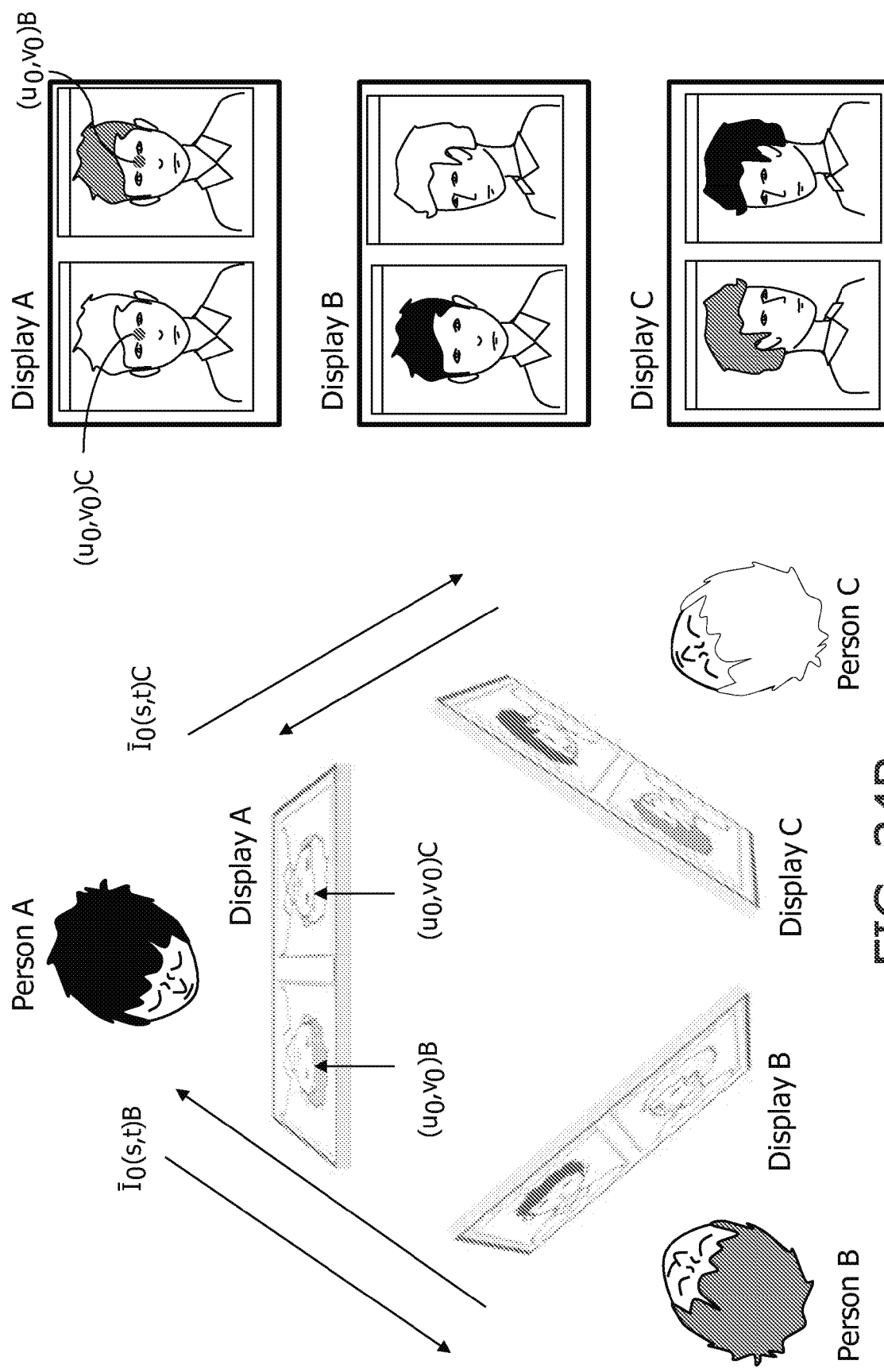

The same preferred embodiments (i.e. choosing the point of view and the amount stereoopsis) are also very useful for systems such as (micro)surgery, wherein the surgeon operates on basis of a camera image. The same applies for systems in which hazardous materials have to be handled remotely. The system allows the operator to choose his or her point of view and to get in real time an accurate 3D all-in focus image.
Videoconferencing
  In a telepresence setup it is important to attain natural eye contact, so that each participant in the conversation is aware who is being addressed. For instance one can place the participants around a virtual roundtable, so that the topology is straightforward to map onto the screens (see FIGS. 34A and 34B). Each participant sends a video stream to the other parties, generated from a virtual camera position that corresponds to each participant's head (better: eye) location on the screen. Thus system A sends stream AB (virtual camera at screen location of B on system A) to system B, and stream AC (virtual camera at C's screen location on display A) to system C. FIG. 34A gives a very schematic setup, FIG. 34B shows more detail The virtual camera positions, indicated in FIG. 34B by (u0,v0)B, respectively (u0,v0)C for the image data sent from system A to system B and C respectively are determined by system A, based on the position of persons B and C's head (eyes) on display A. The determined positions of the eyes provide for signals C0B and C0C, where the signals indicate the position of the eyes of B and C respectively on the screen of A. The system of A uses the input signal C0B to make a virtual image as seen from the view point (u0,v0)B, i.e. the eyes of B and sends the data for the virtual output image to system B. System A sends $\bar{I}0(s,t)B$, i.e. the virtual image as seen from (u0,v0)B to system B. When the person in front of system A looks at the screen in the eyes of person B, person B will perceive direct eye contact with person A. System A sends $\bar{I}0(s,t)C$, i.e. the virtual image as seen from (u0,v0)C to system C. Person C will not perceive direct eye contact. Since all necessary operations can be performed on system A, in this embodiment the invention it is backwards compatible to existing teleconferencing systems, i.e. B and C can be seated in front of a conventional system, although in such embodiments only the remote parties B and C can experience true eye contact. However, when all parties A, B and C employ a means for generating virtual camera positions as in the present invention, the direction of eye contact is perceived by all persons in a consistent way.

The virtual camera position preferably coincides with the position of eyes of the receiving person as they appear on the screen. This position can be manually selected or most preferably automatically detected by a computer-vision algorithm such as proposed by Viola and Jones (see P. Viola and M. Jones, "Rapid object detection using a boosted cascade of simple features", in *Proc. CVPR* 2001). Automatic dynamic detection of the eyes can track, without any human interaction necessary, the updated position and movements of eyes thus giving a true to live eye-to-eye contact. Face recognition algorithms can be used for eye detection, or systems which mark the position of the eyes by for instance the reflection of lights on the cornea or retina.

When all participants are seated in front of means for generating virtual camera positions a unique viewpoint is thus generated for each participant so that everyone knows who is addressing whom in a conversation and true eye to eye contact is possible. One can also recreate a conference in which one of the participants is at the head of the table. In that case the information stream from one participant to another has to comprise information on the position of the participant at the table or the table arrangement has to be set.

Alternatively, during the conference the table seating can be altered, for instance to place a person explaining an item temporarily at the head of the table. The system may comprise means wherein one of the participants, or an outside person, such as a secretary, controls the seating of the participants of the videoconference. Instead of using a round or rectangular table arrangement, one can also use a different setting such as a court room setting or a lecture room setting. The system in embodiments comprises means to choose the setting as well as the seating arrangement prior or during the conference.

3D Screens

For stereo screens, two viewpoints are generated, one for each eye position. In the absence of an exact eye position, the head position (or centre of screen/window) can be taken, and a small offset added/subtracted to attain the virtual camera positions. The standard interocular distance is approximately 7.5 cm. The system in embodiments comprises means for establishing head position.

For autostereoscopic screens, multiple views can be generated corresponding to the display views. Here as well, a position offset is added/subtracted to create each viewpoint.

The above two embodiments illustrated by the block schemes of FIGS. 30 and 32 are based on using a point spread function PSF wherein the second embodiment requires less computing power and, in a sense, provides a computational short-cut of the first embodiment.

Various embodiments of systems are explained.

The inventors have realized that, based on the same general concept, there are further computational simplifications possible.

With reference to FIG. 32 one can combine the inverse filter (convolution with the inverse of the accumulate PSF) and the camera-specific kernel into a single convolution with the image data. A unique filter kernel is thus generated for each camera. The synthetic all-focus image follows from the sum of the filtered array-camera images.

Figure 35:
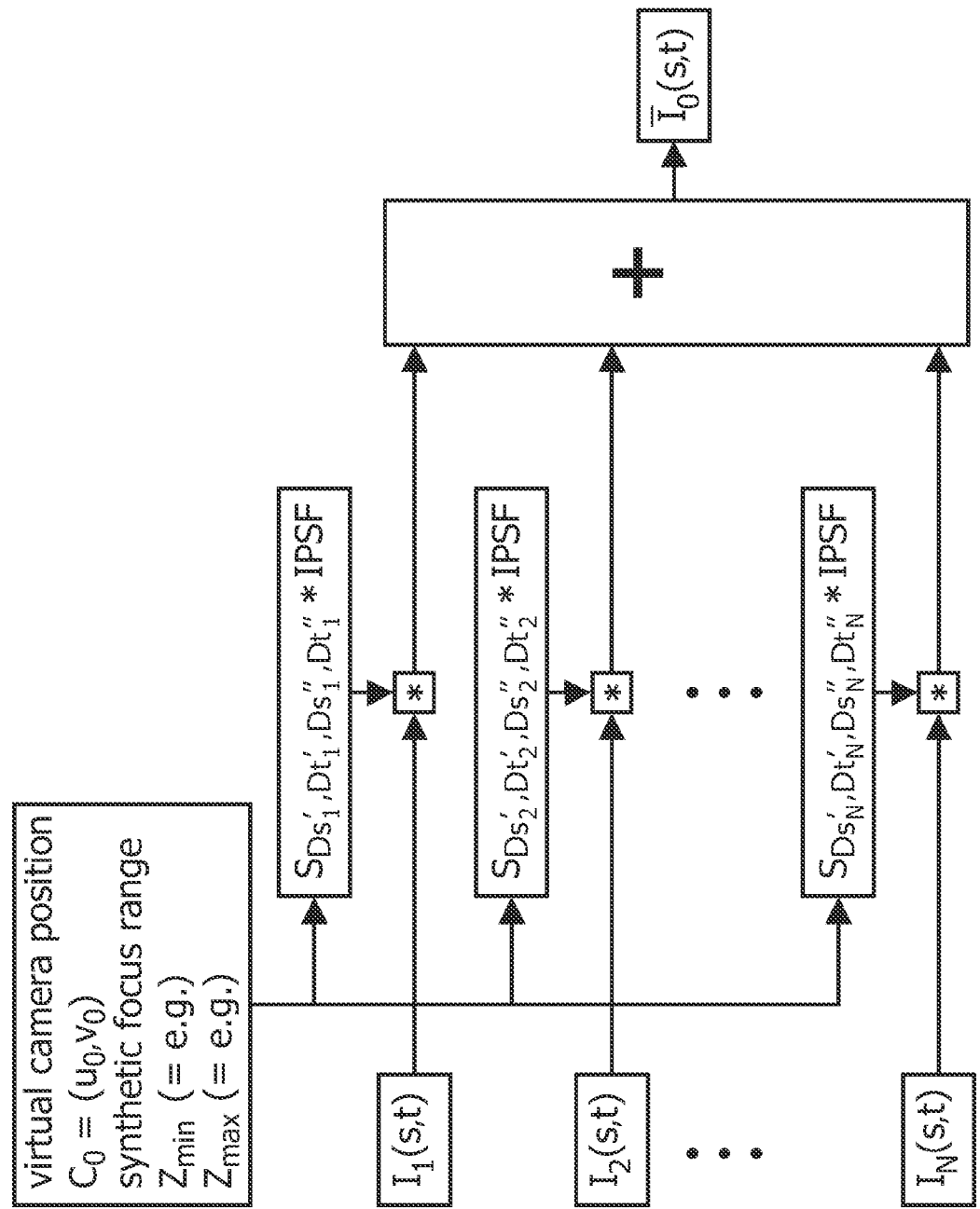
FIG. 35 shows a variation on the scheme of FIG. 32

This scheme is illustrated in FIG. 35. The advantage is that a single convolution is required. Convolutions and summations are commutative, and thus the sequence of convolutions and summations can be altered. Thus, $(I_i*S_i)*IPSF=(S_i*IPSF)*I_i$, where $I_i$ is the image data $S_i$ is the convolution over the path and IPSF is the Inverse Point Spread function. The synthetic all-focus image directly follows from the sum of filtered array-camera images. In effect the schemes of FIG. 32 and FIG. 35 are mathematically the same.

$S_i*IPSF$ is not dependent on the image data.

One can go one step further. The camera specific convolution kernels $S_i*IPSF$ can be approximated by a set of camera-specific, rotated 1D convolutions. This implementation is based on the (approximate) separability of the individual convolution kernels ($S_i*IPSF$). Each 2D convolution kernel is approximated with a pair of perpendicular 1D convolution kernels ($S_{i'}$ and $HP_i$), rotated depending on the respective camera positions.

The filter kernels $S_1 \ldots S_N$ (i.e. projected paths) can be described as rotated 1D box filters, i.e. $S_i = R_i \cdot S_{i'}$, where $S_{i'}$ denotes a 1D kernel and $R_i$ a rotation matrix. A box filter attenuates high frequencies along its path, and therefore suppresses the effect of the IPSF (which has a highpass behaviour) in this direction. The remaining highpass effect of the IPSF convolved with the box filter $S_i$, is mainly perpendicular to the box filter (i.e. projected path), and can be simplified to a rotated 1D kernel $R_i \cdot HP_i$, where $HP_i$ denotes a 1D kernel.

Summarizing: $S_i*IPSF$ is approximated with a rotated pair of 1D convolution kernels ($S_{i'}$ and $HP_i$)

$$S_i*IPSF \approx R_i \cdot (S_{i'}*HP_i) \qquad (20)$$

Where $R_i$ denotes the rotation matrix derived from camera positions $u_i$, $v_i$, $u_0$, $v_0$. Rotation angle $\phi$ is given by $$\tan(\phi_i) = (v_i - v_0)/(u_i - u_0) \qquad (21)$$

The length of the box filter $S_i$ (the projected path) is $$\|S_i\| = \sqrt{((z_{max} - z_{min})(v_i - v_0))^2 + ((z_{max} - z_{min})(u_i - u_0))^2} \qquad (22)$$

And the magnitude of the box filter $S_i$ is $1/\|S_i\|$.

The convolution kernels $HP_i$ have a highpass filter behaviour, and approximately follow |f| (the absolute frequency value) as frequency response, creating a V-shaped magnitude response. The kernels $HP_i$ can be derived by one of the following methods:

Integrate the generated IPSF along the camera angle $\phi_i$ (like a Radon transform of the IPSF)

Assume equivalency to Radon and use a Ram-Lak filter, preferably with filter length $\|S_i\|$ Use a fixed high pass filter, e.g. [−2 5 −2]

Singular value decomposition of $R_i^{-1} \cdot (S_i * IPSF)$. Rotation matrix $R_i^{-1}$ is used to rotate the 2D kernel so that $S_i$ and $HP_i$ will be aligned to the horizontal and vertical axis, thereby simplifying the decomposition.

A frequency based method (slicing in Fourier space)

Trial and error methods are of course also possible, wherein the results of the exact method are compared to the approximate method and the parameters of the filter are fine tuned.

The two convolutions can be performed in any sequence, i.e. first convolution with the projected path $S_i$ followed by convolution with a filter $HP_i$ perpendicular to the projected path or vice versa.

Figure 36:
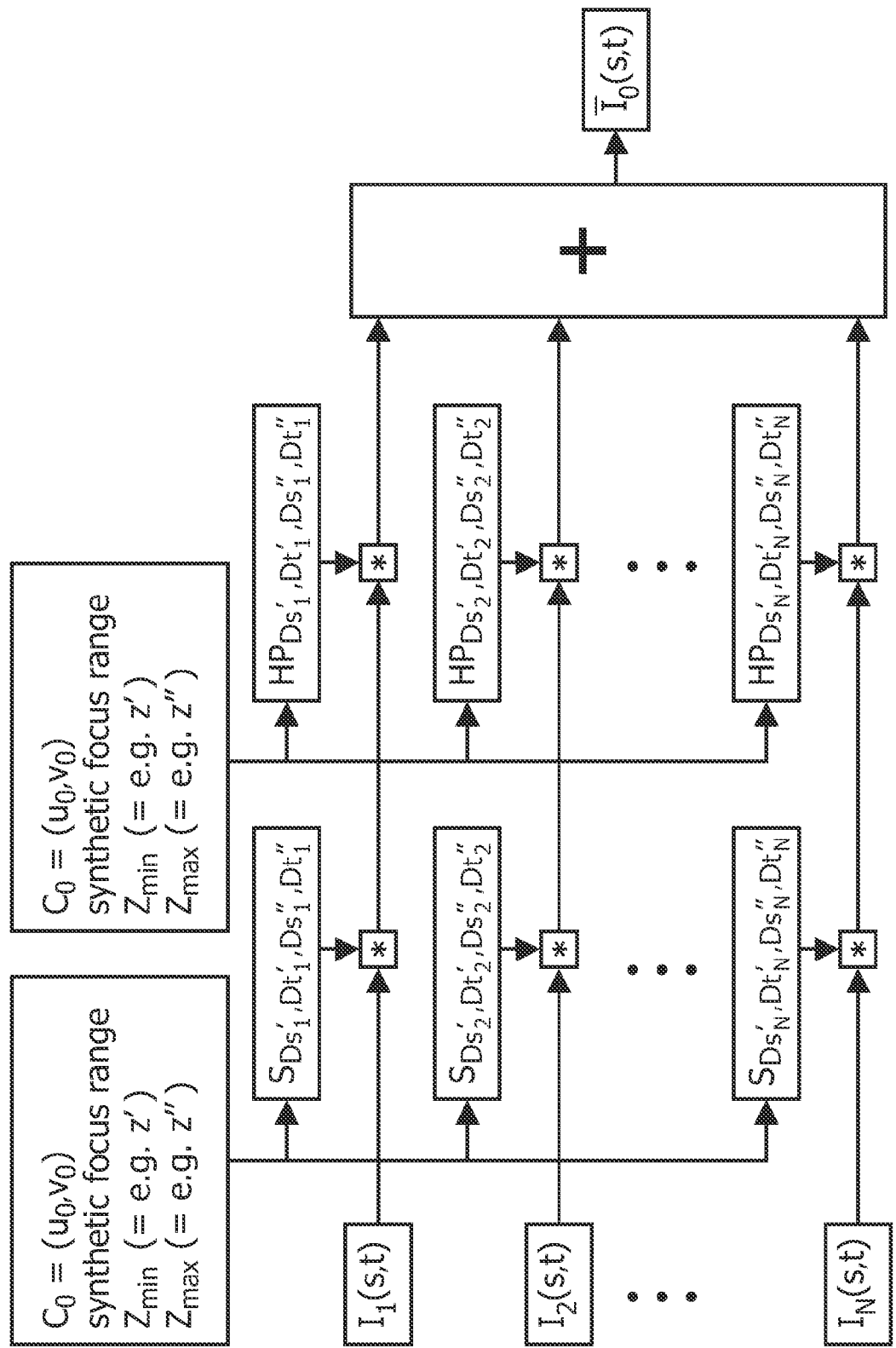
FIG. 36 illustrates a block scheme in which convolution with a high pass filter (HP) is performed after convolution with the respective paths S

FIG. 36 illustrates a block scheme in which convolution with a high pass filter (HP) is performed after convolution with the respective paths S.

FIG. 36 illustrates a fast approximate calculation of a synthetic all-focus image that is synthetically focused at a continuous range of distances, from a minimum focus distance to a maximum focus distance on the basis of filtered backprojection.

As with the first aspect, the sequence of convolutions can be altered.

Thus this aspect of the invention can be performed in various embodiments:

A first embodiment is given by:

a. Generating projected path of the image shift for each image capturing device of the array b. Convolving the individual camera images with their respective projected path and thereafter c. Convolving the image of each image capturing device with a highpass filter perpendicular to the projected path, This is the embodiment illustrated in FIG. 36.

A second embodiment is given by:

a. Generating projected path of the image shift for each image capturing device of the array b. Convolving the image of each image capturing device with a highpass filter perpendicular to the projected path and thereafter c. Convolving the individual camera images with their respective projected path This amounts to switching the sequence of the convolutions.

A third embodiment is given by:

a. Generating a projected path of the image shift for each image capturing device of the array, the path being determined with respect to a virtual camera position with respect to the array b. Generating a convolution filter for each image by convolving its respective projected path with a highpass filter perpendicular to it.

c. Convolving the individual camera images with their respective filter as generated in b.

This embodiment is similar to FIG. 35.

The advantage of this aspect of the invention is the fact that the method is very fast, the disadvantage is that the calculation is approximate. This will reduce the computation power even further, at a cost of some accuracy.

Although a filter with fixed parameters can be used, preferably the high pass filter has parameters that are a function of the projected path, in particular of the length of the projected path.

Now that the convolution kernels have been decomposed into a set of rotated 1D filters, it makes sense to optimize the system further by factoring out the rotation, so that the projection path and highpass filters are truly one dimensional. It may seem that it is computationally more expensive to rotate the images, but such operations are readily available on modern graphics cards, where the cost is reduced to a simple coordinate transform, requiring little computational effort, while the subsequent computational effort for the filtering operations is strongly reduced.

Figure 37:
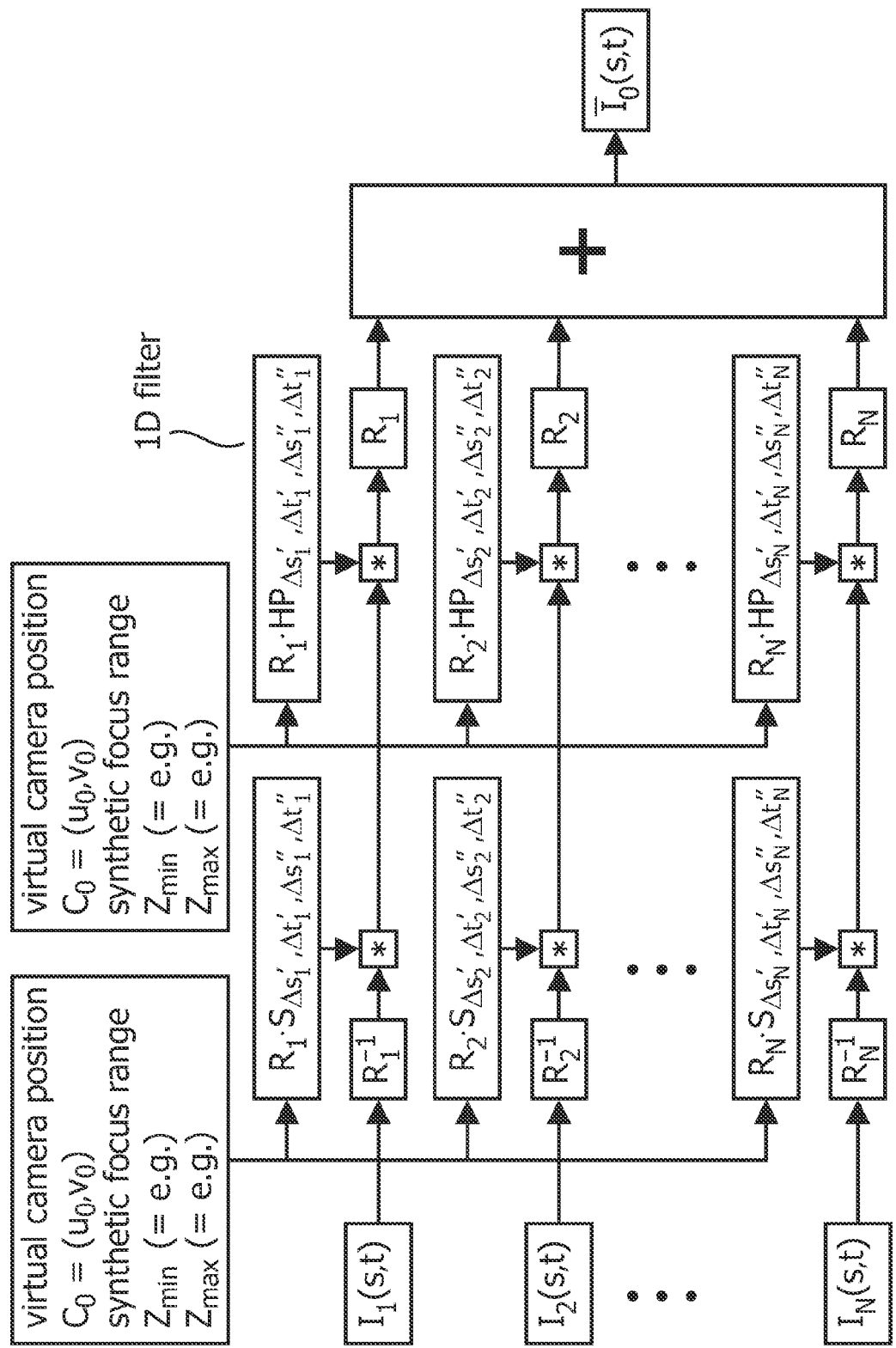
FIG. 37 illustrates a further embodiment of the invention

The resulting scheme is illustrated in FIG. 37.

Note that in FIG. 37 the blocks $R_i * S_i$ and $R_i * HP$ are now pure horizontal and vertical 1D filters. FIG. 37 illustrates a preferred embodiment.

Figure 38:
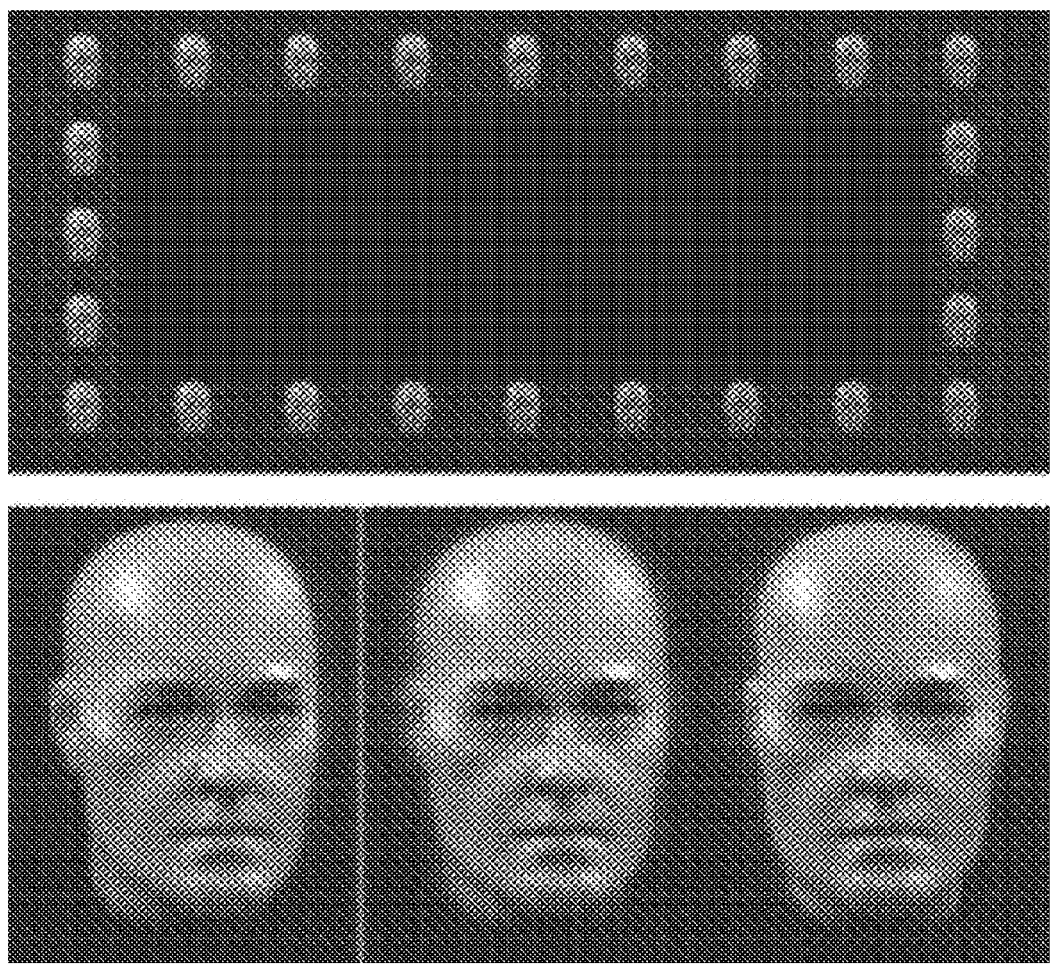
FIG. 38 illustrates the result of the method in accordance with the invention FIG. 39 provides an impression of a system with an array of 16 camera's around a display screen.
Figure 39:
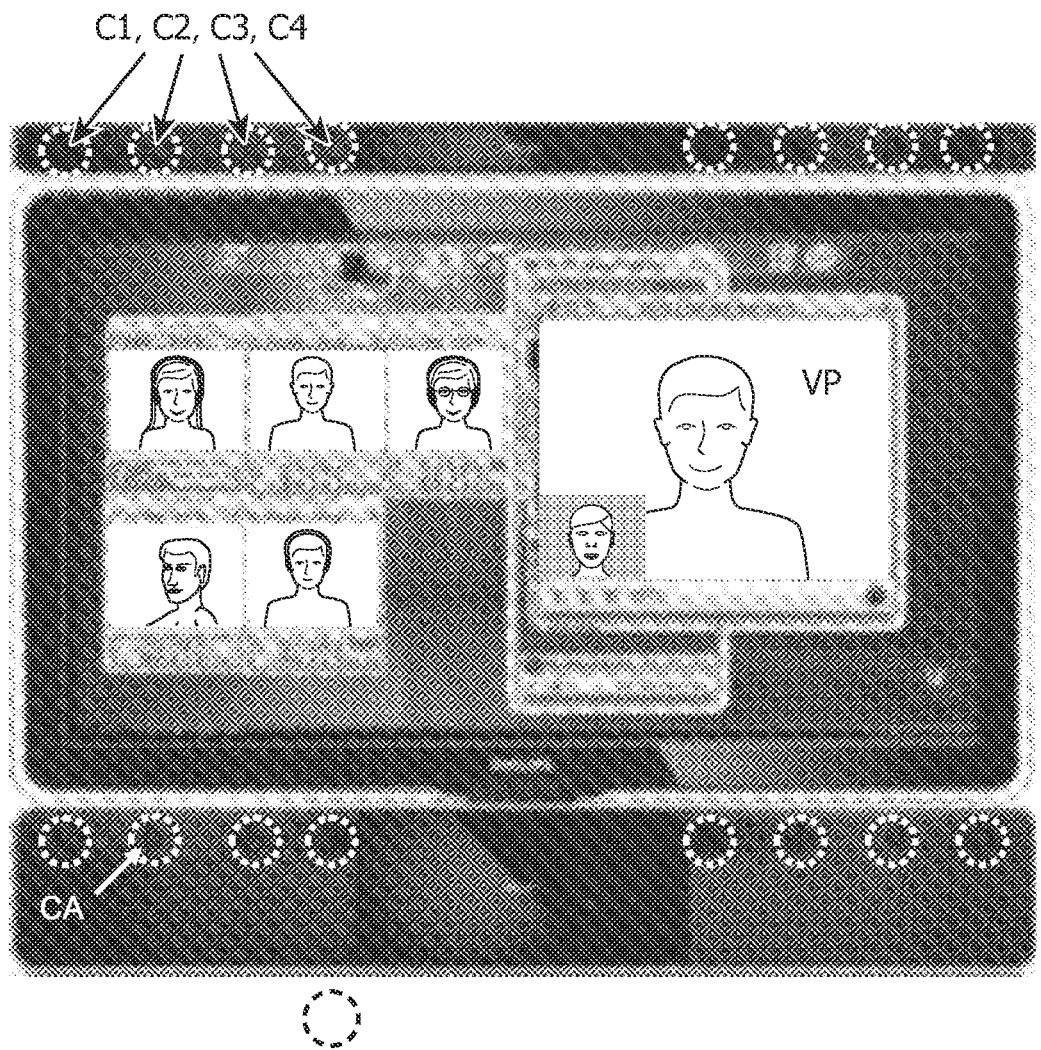

FIG. 38 illustrates the result of the method in accordance with the invention. The top half shows schematically 24 images taken by 24 cameras around the periphery of a display screen. The bottom half shows that all-focus images are obtained, images taken from various virtual camera positions are shown, one for a centre virtual camera position and a left and right virtual camera position FIG. 39 provides an impression of a system with an array of 16 camera's around a display screen. The receiving party portrayed in the large window receives a video stream from the virtual view point VP. He perceives direct eye contact when being looked at.

The method of the invention can be performed by a plenoptic camera.

Extended focus depth is for instance very useful for microscopy and digital pathology.

A single acquisition can encompass a large or even an entire sample depth range, reducing the need for exact focusing in for instance microscopy. Data rate and sampling time are reduced.

The method of the invention can also be performed by an array of individual cameras, situated around for instance a computer screen. This enables amongst others a virtual camera position within the screen surface. The decreased demand for computing power simplifies the creation of a virtual viewpoint within the surface of the screen, so that it becomes possible to perform it in real time.

In preferred embodiments the number of camera around the screen is at least four, preferably eight or more. For an accurate determination of the virtual point of view and an accurate determination of the PSF four or more cameras are useful. In embodiments wherein an even and evenly distributed relatively large number of cameras is used, the method can, in embodiments comprise alternatively using two subsets of camera arrays as explained above. If the two subsets have slightly different virtual viewpoints, real time all-focus 3D recording is possible.

The invention is not restricted to the given exemplary embodiments.

In the claims, any reference signs placed between parentheses shall not be construed as limiting the claim.

The word "comprising" does not exclude the presence of other elements or steps than those listed in a claim. The invention may be implemented by any combination of features of various different preferred embodiments as described above.

A camera is any device for recording images.

It could be a part of a device also used for other purposes such as communication, or attached to, integrated in or cooperating with such a communication device.

Means for performing a step in the method can be in the form of hard-ware, soft-ware or any combination thereof. In the systems and devices according to the various embodiments of the inventions means are provided for performing the steps of the method. Where in the description or claims "means for" are mentioned followed by more than one of the steps of the methods, the means can be a combined means for performing all of the steps, or a short hand notation for a number of means, each of said means for performing one or more of the steps of the method. So, a 'means for integrating' could also be used an 'integrator' either as software or hardware or a combination thereof 'means for generating' can be called a generator for generating, 'means for convolvin' a convolver, 'means for adding' an adder, 'means for constructing' a constructor, 'means for deconvolving' a deconvolvor and within the concept of the invention these can be part of software, hardware, or any other ware. The various means have been described as separate for the ease of description. This does not mean that the invention would be restricted to such means being separate units, functions could be combined in an integrated device or piece of software.

Where use is made of the method and system any such means can be present in or near the camera or in a device at or near the scene to which the camera is connected. However, image data can also be analysed or processed remotely, as can the system be controlled remotely. The means for treating data, in whatever manner, do not have to be situated at the same location. Some of the data treatment can be performed by means located at or near a camera, in particular in those embodiments where data from a camera is convoluted with a single convolution, such as in FIG. 35, whereas more general data treatment such as summation or adding can be performed by means in a CPU. The embodiments wherein the image data of separate cameras undergo a treatment, e.g. convolving the individual images with the respective paths (S) are in this respect advantageous since in such embodiments of the invention these treatments can be performed immediately after capturing the image which could be done by a means close to, attached to or integrated into the camera. This increases the speed of operation.

The invention also relates to computer programs comprising program code means for performing a method according to the invention when said program is run on a computer, as well as computer program product comprising program code means stored on a computer readable medium for performing a method according to the invention.

There where mention is made of 'each image capturing device' each device that is used in the method of the invention and/or is active in the system is meant. When a large array of cameras is present around for instance a display screen the array may be subdivided into subarrays, one or more of the subarrays performing the method, and not necessarily the same embodiment of the invention. It is also possible that when a system comprise an array of N image capturing devices, only a part of the image capturing devices (M<N) are used, for instance to reduce the amount of data that is collected and must be processed and/or sent. This may be done in response to data received from the intended receiving device. If, for instance, the virtual output images are to be sent to a device such as e.g. a portable device having only limited resolution, there is no need for generating high quality images, given that at the receiving end only a limited resolution is available and thus the number of image capturing devices used in the method for providing the image may be restricted, for instance using only half or one quarter of the cameras around a display screen, for instance only 8 of the 16.

In short the invention can be described by:

In a method and system for providing virtual output images from an array of image capturing devices image data ($I_1(s,t)$, $I_2(s,t)$) is taken from the devices ($C_1$, $C_2$). This image data is processed by convolving the image data ($I_1(s,t)$, $I_2(s,t)$) with a function, e.g. the path (S) and thereafter deconvolving them, either after or before summation (SUM), with an inverse point spread function (IPSF) or a filter (HP) equivalent or similar thereto to produce all-focus image data ($\tilde{I}_0(s,t)$). This is done with respect to a virtual camera position the position of which forms an input method and system. In particular the method and system is advantageous when two or more interacting (sub)systems are used. The invention then allows for real/time realistic eye-to-eye contact simulation.

The invention claimed is:

1. A method performed by a computer system for producing output image data for a virtual output image from input image data of individual input images provided by an array of image capturing devices for capturing a number of the individual input images from different viewpoints, the method comprising acts of:
   providing a virtual camera position by an input virtual camera position signal representing the virtual camera position;
   adding corresponding pixel values of the individual input images to form an integrated image; and
   inverse filtering the integrated image based on multiple depth layers in a scene,
   wherein the adding and inverse filtering acts are performed in dependence of the virtual camera position to produce the output image data for the virtual output image as seen from the virtual camera position, wherein the array of image capturing devices is an array of cameras around a display screen and the virtual camera position is a point at the display screen, wherein the virtual camera position is variable and is determined by measuring a position of eyes on the display screen.

2. The method as claimed in claim 1, wherein the acts of adding and inverse filtering comprise acts of:
   constructing from the input image data of the individual input images image data for a number of synthetically focused images at a number of depths;
   adding the image data of the number of synthetically focused images at various depths to form the image data for an integrated blurred image; and
   deconvolving the integrated blurred image using an inverse point spread function for producing the image data for the virtual image, from the input image data of the individual input images.

3. The method as claimed in claim 2, further comprising acts of:
   for a number of depths, shifting the individual input images provided by the image capturing devices in proportion to a distance between a position of a particular image capturing device and the virtual camera position and in dependence on a specific depth, to align the individual input images to the virtual camera position;
   adding the image data for the shifted images at each depth together to form image data of synthetically focused images at the number of depths;
   adding the synthetically focused images to form the integrated blurred image;
   generating a point spread function by integrating expected blur kernels for a pixel; and deconvolving the integrated blurred image, using the inverse point spread function of the point spread function, for producing the image data for the virtual output image at the virtual camera position provided by the input virtual camera position signal.

4. The method as claimed in claim 1, wherein the adding and inverse filtering acts comprise acts of:
generating a projected path of the image shift with respect to the virtual camera position for each image capturing device of the array, the projected path being a sum of translating impulse response functions, for aligning the image of an image capturing device with the virtual camera position at a number of depths;
convolving the individual input images with their respective projected path to form convolved
adding the convolved images to form an integrated blurred image;
generating a point spread function by integration of the projected paths; and
deconvolving the integrated image, using an inverse point spread function of the point spread function, for producing the image data for the virtual output image at the virtual camera position provided by the input virtual camera position signal.

5. The method as claimed in claim 1, wherein the adding and inverse filtering acts comprise acts of:
generating a projected path of the image shift for each image capturing devices of the array with respect to the virtual camera position, the projected path being a sum of translating impulse response functions for aligning the image with the virtual camera position at a number of depths;
generating a point spread function by integration of the projected paths;
for each image convolving the respective projected path with an inverse point spread function;
convolving each image with the convolution of path and inverse point spread function providing a convolved image; and
adding the convolved images for producing the image data for the virtual output image at the virtual camera position provided by the input virtual camera position signal.

6. The method of claim 1, wherein the adding and inverse filtering acts comprise acts of:
generating a projected path of the image shift for each image capturing device of the array, the path being determined with respect to the virtual camera position, the projected path being a sum of translating impulse response functions for aligning the image of a image capturing device with the virtual camera position at a number of depths;
convolving the individual input images with their respective projected path;
convolving the image of each image capturing device with a highpass filter perpendicular to the projected path; and
adding the convolved images for producing the image data for the virtual output image at the virtual camera position provided by the input virtual camera position signal.

7. The method as claimed in claim 1, wherein the adding and inverse filtering acts comprise acts of:
generating a projected path of the image shift for each image capturing device of the array, the path being determined with respect to the virtual camera position, the projected path being a sum of translating impulse response functions for aligning the image of a image capturing device with the virtual camera position at a number of depths;
generating a convolution filter for each image by convolving its respective projected path with a highpass filter perpendicular to the respective projected path;
convolving the individual input images with their respective filter as generated in the act of generating the convolution filter;
adding the convolved images for producing the image data for the virtual output image at the virtual camera position provided by the input virtual camera position signal.

8. The method as claimed in claim 1, wherein multiple virtual viewpoints are generated simultaneously from a set of images captured by an array of image capturing devices.

9. The method as claimed in claim 1, wherein two virtual camera positions for left-right eye virtual camera positions are provided to provide two virtual output images at two virtual camera positions.

10. The method as claimed in claim 1, wherein the virtual camera position is automatically and dynamically determined by an eye position detector.

11. A non-transitory computer readable medium comprising computer instructions which, when executed by a processor, configure the processor to perform acts for producing output image data for a virtual output image from input image data of individual input images provided by an array of image capturing devices for capturing a number of the individual input images from different viewpoints, the acts comprising:
providing a virtual camera position by an input virtual camera position signal representing the virtual camera position;
adding corresponding pixel values of the individual input images to form an integrated image; and
inverse filtering the integrated image based on multiple depth layers in a scene,
wherein the adding and inverse filtering acts are performed in dependence of the virtual camera position to produce the output image data for the virtual output image as seen from the virtual camera position, wherein the array of image capturing devices is an array of cameras around a display screen and the virtual camera position is a point at the display screen, wherein the virtual camera position is variable and is determined by measuring a position of eyes on the display screen.

12. A system for constructing an output image from input images obtained by an array of image capturing devices, the system comprising:
an array of image capturing devices for capturing images from different view points; and
a processor configured to
obtain image data from the images captured by the image capturing devices of the array,
add and inverse filter corresponding pixel values of individual input images captured by the image capturing devices based on multiple depth layers in a scene, and
provide a selected virtual camera position by an input virtual camera position signal representing the virtual camera position,
wherein the processor adds and inverse filters as a function of the selected virtual camera position to produce the image data for the virtual output image at the virtual camera position provided by the input virtual camera position signal,
wherein the array of image capturing devices is an array of cameras around a display screen and the virtual camera position is a point at the display screen, and
wherein the system further comprises two interacting subsystems, each subsystem comprising an array of cameras around a display screen, and the virtual camera position at the display screen of a first subsystem of the systems is variable and is determined by a second subsystem of the systems by measuring a position of eyes of a viewer of the second subsystem.

13. The system as claimed in claim 12, wherein the processor is further configured to:
construct from the input image data of the individual input images image data for a number of synthetically focused images at a number of depths,
add the image data of the number of synthetically focused images at various depths to form the image data for an integrated blurred image, and
deconvolve the integrated blurred image using an inverse point spread function for producing the image data for the virtual image, from the input image data of the individual input images.

14. The system as claimed in claim 13, wherein the processor is further configured to:
shift for a number of depths the individual input images provided by the image capturing devices in proportion to the distance between the position of the particular image capturing devices and the virtual camera position and in dependence on the specific depth, to align the individual input images to the virtual camera position, and
add the image data for the shifted images at each depth together to form image data of a synthetically focused images at the number of depths,
add the number of synthetically focussed images to form the integrated blurred image,
generate a point spread function by integrating expected blur kernels for a pixel,
deconvolve the integrated blurred image, using the inverse point spread function of the point spread function, for producing the image data for the virtual output image at the virtual camera position provided by the input virtual camera position signal.

15. The system as claimed in claim 12, wherein the processor is further configured to:
generate a projected path of the image shift with respect to the virtual camera position or each image capturing device of the array, the projected path being a sum of translating impulse response functions, for aligning the image of a image capturing device with the virtual camera position at a number of depths,
convolve the individual input images with their respective projected path to form convolved images,
add the convolved images to form an integrated blurred image,
generate a point spread function by integration of the projected paths, and
deconvolve the integrated image, using an inverse point spread function of the point spread function, for producing the image data for the virtual output image at the virtual camera position provided by the input virtual camera position signal.

16. The system as claimed in claim 12 wherein the processor is further configured to:
generate a projected path of the image shift for each image capturing devices of the array with respect to the virtual camera position, the projected path being a sum of translating impulse response functions for aligning the image with the virtual camera position at a number of depths,
generate a point spread function by integration of the projected paths;
convolve for each image the respective projected path with an inverse point spread function;
convolve each image with the convolution of path and inverse point spread function providing a convolved image; and
add the convolved images for producing the image data for the virtual output image at the virtual camera position provided by the input virtual camera position signal.

17. The system as claimed in claim 12, wherein the processor is further configured to:
generate a projected path of the image shift for each image capturing device of the array, the path being determined with respect to the virtual camera position, the projected path being a sum of translating impulse response functions for aligning the image of a image capturing device with the virtual camera position at a number of depths,
convolve the individual input images with their respective projected path,
convolve the image of each image capturing device with a highpass filter perpendicular to the projected path,
add the convolved images for producing the image data for the virtual output image at the virtual camera position provided by the input virtual camera position signal.

18. The system as claimed in claim 12 wherein the processor is further configured to:
generate a projected path of the image shift for each image capturing device of the array, the path being determined with respect to the virtual camera position, the projected path being a sum of translating impulse response functions for aligning the image of a image capturing device with the virtual camera position at a number of depths,
generate a convolution filter for each image by convolving its respective projected path with a highpass filter perpendicular to the respective projected path,
convolve the individual input images with their respective generated filter,
add the convolved images for producing the image data for the virtual output image at the virtual camera position provided by the input virtual camera position signal.

19. The system claimed in claim 12, wherein the array is subdivided into two or more subarrays.

20. The system as claimed in claim 19, wherein the system is arranged to allocate different virtual camera positions to the subarrays.

* * * * *